United States Patent
Kobayashi

(10) Patent No.: US 11,190,668 B2
(45) Date of Patent: Nov. 30, 2021

(54) IMAGE PROCESSING APPARATUS, PRINTING SYSTEM, METHOD FOR EMBEDDING LATENT IMAGE, AND STORAGE MEDIUM

(71) Applicant: Ryo Kobayashi, Kanagawa (JP)

(72) Inventor: Ryo Kobayashi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/903,399

(22) Filed: Jun. 17, 2020

(65) Prior Publication Data

US 2020/0412908 A1    Dec. 31, 2020

(30) Foreign Application Priority Data

Jun. 25, 2019 (JP) .............................. JP2019-117930
Apr. 25, 2020 (JP) .............................. JP2020-077864

(51) Int. Cl.
*H04N 1/60* (2006.01)
*H04N 1/32* (2006.01)
*H04N 1/00* (2006.01)

(52) U.S. Cl.
CPC ....... *H04N 1/32347* (2013.01); *H04N 1/0044* (2013.01); *H04N 1/6022* (2013.01)

(58) Field of Classification Search
CPC . H04N 1/32347; H04N 1/6022; H04N 1/0044
See application file for complete search history.

(56) References Cited

U.S. PATENT DOCUMENTS

| | | | | |
|---|---|---|---|---|
| 6,957,024 B2 * | 10/2005 | Shinkawa | ............ | G03G 21/043 399/252 |
| 7,298,528 B2 * | 11/2007 | Nagashima | .............. | B41M 3/14 358/3.06 |
| 8,085,444 B2 * | 12/2011 | Kinoshita | ............ | G03G 21/043 358/3.28 |
| 8,455,087 B2 * | 6/2013 | Eschbach | ............. | G03G 21/046 428/195.1 |
| 8,460,781 B2 * | 6/2013 | Eschbach | ........... | H04N 1/32149 428/195.1 |
| 9,614,995 B1 * | 4/2017 | Chapman | ........... | H04N 1/32309 |
| 10,237,436 B1 * | 3/2019 | Das | ........................ | H04N 1/387 |

(Continued)

FOREIGN PATENT DOCUMENTS

| | | | | |
|---|---|---|---|---|
| EP | 2144154 A2 * | 1/2010 | .......... | G06F 3/1253 |
| JP | 7-319347 | 12/1995 | | |

(Continued)

OTHER PUBLICATIONS

Extended European Search Report dated Nov. 6, 2020 in European Patent Application No. 20180480.4, 13 pages.

*Primary Examiner* — Ted W Barnes
(74) *Attorney, Agent, or Firm* — Xsensus LLP

(57) ABSTRACT

An image processing apparatus includes processing circuitry. The processing circuitry is configured to compose background information with latent image information to generate a latent-image-embedded image, add the latent-image-embedded image to print data, and at least one of extract the latent image information from the print data and extract the background information from the print data.

12 Claims, 33 Drawing Sheets

(56) References Cited

U.S. PATENT DOCUMENTS

| | | | |
|---|---|---|---|
| 2003/0179412 A1* | 9/2003 | Matsunoshita | G06T 1/0064 358/3.28 |
| 2004/0150859 A1* | 8/2004 | Hayashi | H04N 1/00867 358/3.28 |
| 2004/0255808 A1* | 12/2004 | Nagashima | B41M 3/14 101/491 |
| 2006/0033962 A1* | 2/2006 | Matsunoshita | H04N 1/6022 358/3.28 |
| 2007/0047826 A1* | 3/2007 | Aritomi | H04N 1/00883 382/232 |
| 2007/0097413 A1* | 5/2007 | Nakai | H04N 1/4413 358/1.14 |
| 2007/0097414 A1* | 5/2007 | Harada | H04N 1/32325 358/1.14 |
| 2007/0171480 A1* | 7/2007 | Matsunoshita | H04N 1/32144 358/3.28 |
| 2008/0100880 A1* | 5/2008 | Matsunoshita | H04N 1/32149 358/471 |
| 2008/0141878 A1* | 6/2008 | Arthur | H04N 1/6022 101/211 |
| 2009/0129592 A1* | 5/2009 | Swiegers | G06T 1/0028 380/54 |
| 2009/0262400 A1* | 10/2009 | Eschbach | H04N 1/32309 358/3.28 |
| 2010/0302588 A1* | 12/2010 | Ohno | G03G 15/5025 358/1.15 |
| 2012/0127492 A1* | 5/2012 | Harada | H04N 1/32309 358/1.9 |
| 2013/0057880 A1* | 3/2013 | Yokoi | H04N 1/60 358/1.9 |
| 2013/0135422 A1 | 5/2013 | Kobayashi | |
| 2013/0250366 A1* | 9/2013 | Kinoshita | G06K 15/1892 358/3.28 |
| 2015/0078769 A1* | 3/2015 | Kogusuri | G03G 15/6585 399/39 |
| 2018/0239282 A1* | 8/2018 | Sakai | H04N 1/32309 |
| 2020/0278618 A1* | 9/2020 | Kanatani | G03G 9/122 |

FOREIGN PATENT DOCUMENTS

| | | | |
|---|---|---|---|
| JP | 07319347 A * | 12/1995 | |
| JP | 10-198222 | 7/1998 | |
| JP | 2006-053725 | 2/2006 | |
| JP | 2006053725 A * | 2/2006 | B42D 25/21 |
| WO | WO2007/004534 A1 | 1/2007 | |
| WO | WO-2007004534 A1 * | 1/2007 | H04N 1/3871 |

* cited by examiner

FIG. 8

LATENT IMAGE AREA 1
"PAGE NUMBER" : "1"
"COORDINATE_x" : "100"
"COORDINATE_y" : "100"
"REGION WIDTH" : "300"
"REGION HEIGHT" : "300"

LATENT IMAGE AREA 2
"COORDINATE_x" : "200"
"COORDINATE_y" : "200"
"REGION WIDTH" : "200"
"REGION HEIGHT" : "200"

LATENT IMAGE AREA 3
"PAGE NUMBER" : "2"
"COORDINATE_x" : "100"
"COORDINATE_y" : "100"
"REGION WIDTH" : "300"
"REGION HEIGHT" : "300"

ANY NUMBER OF AREAS WHERE LATENT IMAGES ARE TO BE CONCEALED CAN BE SET.

FIG. 18

```
BACKGROUND AREA 1
"PAGE NUMBER" : "1"
"COORDINATE_x" : "100"
"COORDINATE_y" : "100"
"REGION WIDTH" : "300"
"REGION HEIGHT" : "300"

BACKGROUND AREA 2
"COORDINATE_x" : "200"
"COORDINATE_y" : "200"
"REGION WIDTH" : "200"
"REGION HEIGHT" : "200"

BACKGROUND AREA 3
"PAGE NUMBER" : "2"
"COORDINATE_x" : "100"
"COORDINATE_y" : "100"
"REGION WIDTH" : "300"
"REGION HEIGHT" : "300"

ANY NUMBER OF AREAS WHERE LATENT IMAGES ARE TO BE
CONCEALED CAN BE SET.
```

FIG. 28

LATENT IMAGE AREA 1
"PAGE NUMBER" : "1"
"COORDINATE_x" : "100"
"COORDINATE_y" : "100"
"REGION WIDTH" : "300"
"REGION HEIGHT" : "300"

BACKGROUND AREA 1
"PAGE NUMBER" : "1"
"COORDINATE_x" : "100"
"COORDINATE_y" : "100"
"REGION WIDTH" : "300"
"REGION HEIGHT" : "300"

LATENT IMAGE AREA 2
"PAGE NUMBER" : "1"
"COORDINATE_x" : "200"
"COORDINATE_y" : "200"
"REGION WIDTH" : "200"
"REGION HEIGHT" : "200"

BACKGROUND AREA 2
"PAGE NUMBER" : "2"
"COORDINATE_x" : "100"
"COORDINATE_y" : "100"
"REGION WIDTH" : "300"
"REGION HEIGHT" : "300"

ANY NUMBER OF AREAS WHERE LATENT IMAGES ARE TO BE CONCEALED CAN BE SET.

IMAGE PROCESSING APPARATUS, PRINTING SYSTEM, METHOD FOR EMBEDDING LATENT IMAGE, AND STORAGE MEDIUM

CROSS-REFERENCE TO RELATED APPLICATION

This patent application is based on and claims priority pursuant to 35 U.S.C. § 119(a) to Japanese Patent Application Nos. 2019-117930, filed on Jun. 25, 2019, and 2020-077864, filed on Apr. 25, 2020, in the Japan Patent Office, the entire disclosure of each of which is hereby incorporated by reference herein.

BACKGROUND

Technical Field

Embodiments of the present disclosure relate to an image processing apparatus, a printing system, a method for embedding a latent image, and a storage medium.

Related Art

There has been known a technique for printing an infrared latent image in which information invisible under normal light and detectable only by an infrared light sensing device is embedded. As a printing technique of an infrared latent image, there is a technique of embedding an infrared latent image in a background image by using a difference in optical characteristics of general color materials of cyan (C), magenta (M), yellow (Y), and black (K).

There is known a method for embedding an infrared latent image in any background image with K toner. In the method, regarding a color reproduction method of a background image to be embedded with an infrared latent image, a portion where the infrared latent image is printed is reproduced by adding a K color material to CMY color materials as lower colors, and a portion where the infrared latent image is not printed is reproduced only by the CMY color materials. Thus, in the method, the infrared latent image is embedded in the background image.

Since the amounts of the lower colors of CMY and the amount of printing of K are set so that a portion to be printed by adding the K color material with the CMY color materials as the lower colors and a portion to be printed with only the CMY color material are seen as substantially the same color, the infrared latent image printed with the K toner cannot be observed under visible light. However, since the CMY color materials transmit infrared light and the K color material containing general carbon black has a property of absorbing infrared light, in the infrared sensing device, the CMY color materials do not appear and only a portion in which the black color material is embedded appears as an infrared latent image. In such a case, the K component of the CMYK image holds latent image information, and the CMY components serve as masks for concealing the latent image. According to the above-described technique, since it is not necessary to use a special toner for printing an infrared latent image, a printed matter highly protected from forgery can be produced by a general-purpose CMYK printer at low cost.

When a latent-image-embedded image is held with a K color material as in the above-described method, a K component as a latent image and CMY components as a mask image for concealing the latent image are used, and thus color information needs to be held in CMYK colors. However, a general document creation application does not support CMYK colors but supports only RGB colors. Therefore, in a general document creation application, it is difficult to add a latent-image-embedded image to document data or to convert information in document data into a latent-image-embedded image. For example, when a latent-image-embedded image created in CMYK colors is added to a document image by a document creation application that supports only RGB colors, the CMYK colors are converted into RGB colors. In addition, for example, when the latent-image-embedded image is color-converted from CMYK colors to RGB colors, the latent image and the mask image are mixed on the image data, so that the latent image information is destroyed and the infrared latent image cannot be correctly printed.

Although some image processing applications can properly handle CMYK color images in addition to RGB colors, the introduction and proficiency of such applications is costly. Modifying a general application so as to appropriately handle CMYK colors also causes a lot of costs.

There is also known a technique in which, when printing is performed from a document creation application via a printer driver, a latent-image-embedded image in which a latent image is embedded with general-purpose CMYK color materials is added to a predetermined coordinate position of print data generated by the printer driver. In this manner, adding information in CMYK to data generated by the printer driver can prevent latent image information from being destructed by an application that supports only RGB.

SUMMARY

In an aspect of the present disclosure, there is provided an image processing apparatus that includes processing circuitry. The processing circuitry is configured to compose background information with latent image information to generate a latent-image-embedded image, add the latent-image-embedded image to print data, and at least one of extract the latent image information from the print data and extract the background information from the print data.

In another aspect of the present disclosure, there is provided a method for embedding a latent image in an electronic device. The method includes composing background information with latent image information to generate a latent-image-embedded image, adding the latent-image-embedded image to print data, and at least one of extracting the latent image information from the print data and extracting the background information from the print data.

In still another aspect of the present disclosure, there is provided a non-transitory storage medium storing computer readable code for controlling a computer to carry out: composing background information with latent image information to generate a latent-image-embedded image; adding the latent-image-embedded image to print data; and at least one of extracting the latent image information from the print data and extracting the background information from the print data.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 8 is a diagram illustrating an example of holding selected latent image area information;

FIG. 18 is a diagram illustrating an example of holding selected background information;

FIG. 28 is a diagram illustrating an example of holding selected background information;

Figure 1:
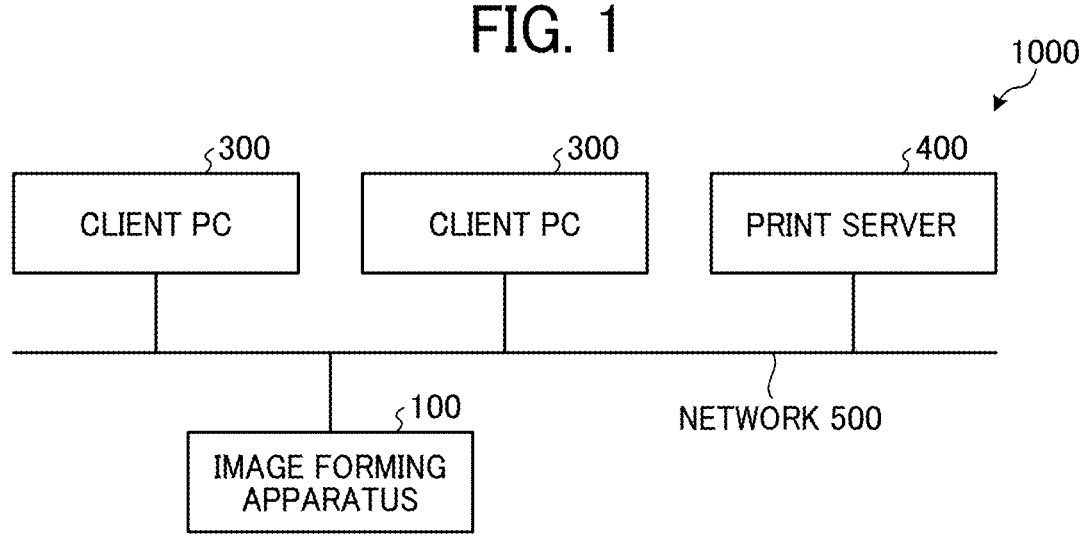
FIG. 1 is a block diagram illustrating an overall configuration of a printing system according to a first embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, embodiments of an image processing apparatus, a printing system, a carrier/recording medium storing program code, and a latent image embedding method are described in detail with reference to the accompanying drawings.

First Embodiment

FIG. 1 is a block diagram illustrating an overall configuration of a printing system according to a first embodiment. As illustrated in FIG. 1, a printing system 1000 according to the first embodiment includes one or more client personal computers (PCs) 300, a print server 400, and an image forming apparatus 100 functioning as an image processing apparatus that are connected via a network 500. The client PC 300 and the image forming apparatus 100 are electronic devices.

An outline of a printing process in the printing system is described below. Document data created in an application having a print function that runs on the client PC 300 is converted into print data via a printer driver inside the client PC 300. The print data is transmitted from the client PC 300 to the image forming apparatus 100, edited and analyzed by an image processing apparatus 200 (see FIG. 5) in the image forming apparatus 100, and converted into printable raster data. The raster data is printed by a plotter 120 of the image forming apparatus 100 (see FIG. 5).

After the print data is transmitted from the client PC 300 to the print server 400 and is subjected to editing and necessary setting on the print server 400, the print data may be transmitted from the print server 400 to the image forming apparatus 100.

Instead of transmitting the print data from the client PC 300, a document stored in advance in the print server 400 may be directly transmitted to the image forming apparatus 100.

Figure 2:
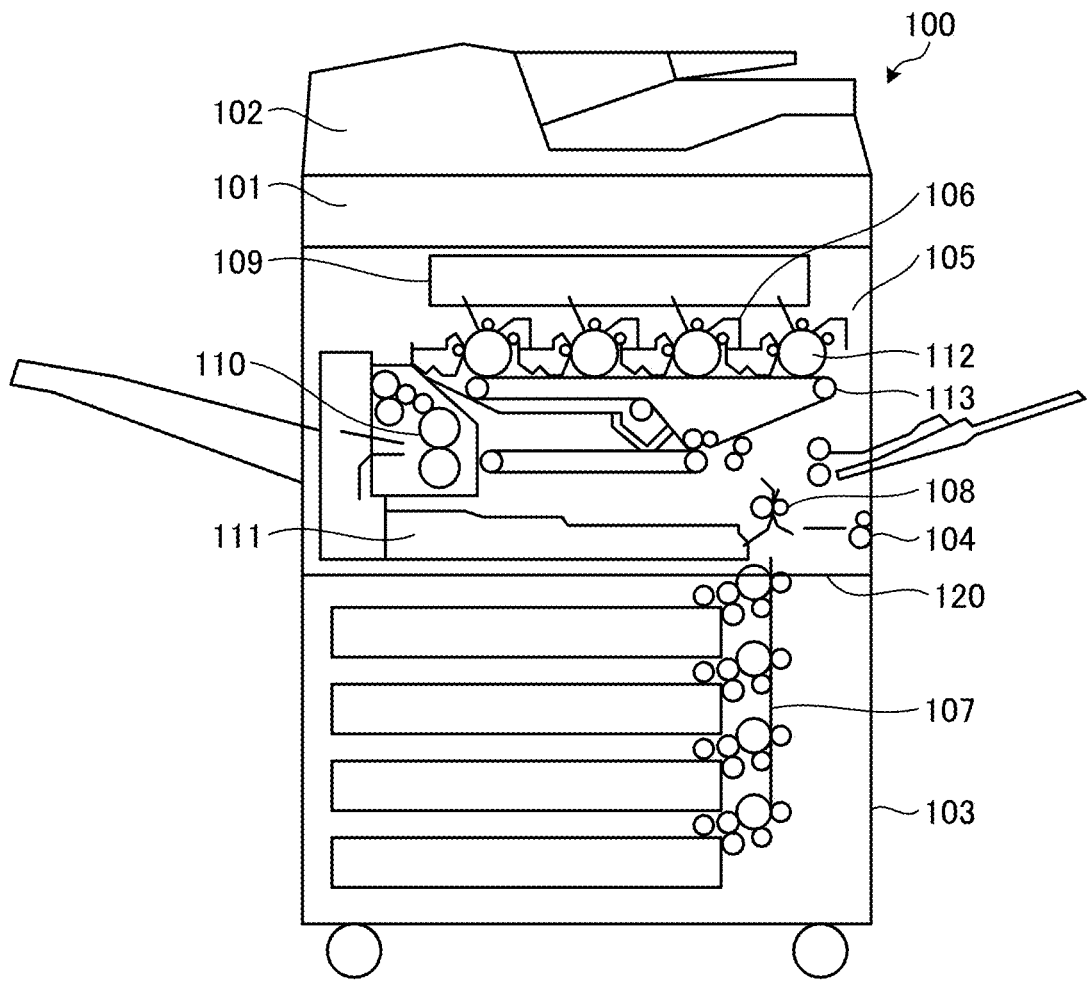
FIG. 2 is a schematic cross-sectional view of a configuration of an image forming apparatus.

FIG. 2 is a schematic cross-sectional view of a configuration of the image forming apparatus 100. The image forming apparatus 100 is a multifunction peripheral having at least two of a copy function, a printer function, a scanner function, and a facsimile function.

As illustrated in FIG. 2, the image forming apparatus 100 includes a sheet feeder 103, an apparatus body 104, a scanner 101, and an auto document feeder (ADF) 102.

The image forming apparatus 100 includes the plotter 120 as an image forming unit in the apparatus body 104. The plotter 120 includes a tandem-system image formation unit 105, a registration roller 108 that supplies a recording sheet from the sheet feeder 103 to the image formation unit 105 via a conveyance path 107, an optical writing device 109, and a fixing unit 110, and a double-sided tray 111.

In the image formation unit 105, four photoconductor drums 112 are arranged in parallel corresponding to four colors of yellow (Y), magenta (M), cyan (C), and black (infrared absorbing visible toner (K)). Image formation elements including a charger, a developing device 106, a transfer device, a cleaner, and a static eliminator are arranged around each of the photoconductor drums 112. Further, an intermediate transfer belt 113 is sandwiched between respective nips of the transfer device and the photoconductor drum 112 and is stretched between a driving roller and a driven roller.

That is, the image forming apparatus 100 creates an infrared latent image using general-purpose CMYK toner, not special transparent toner. In the infrared sensing device, since the CMY toner is transparent, only the portions where the black toner is embedded can be reflected.

The tandem-system image forming apparatus 100 thus configured reads a document sent from the ADF 102 by the scanner 101, optically writes the read document images by the optical writing device 109 into the photoconductor drums 112 corresponding to the colors of YMCK, develops the written document images by the developing device 106 according to respective toner of the colors, and subjects the developed images to primary transfer onto the intermediate transfer belt 113 in the order of Y, M, C, and K, for example. Then, the image forming apparatus 100 subjects a full-color image in which the four color images are superimposed by the primary transfer to secondary transfer onto the recording paper supplied from the sheet feeder 103, then fixes the full-color image by the fixing unit 110, and then discharges the recording paper, whereby the full-color image is formed on the recording paper.

Next, a hardware configuration of the image forming apparatus 100 is described.

Figure 3:
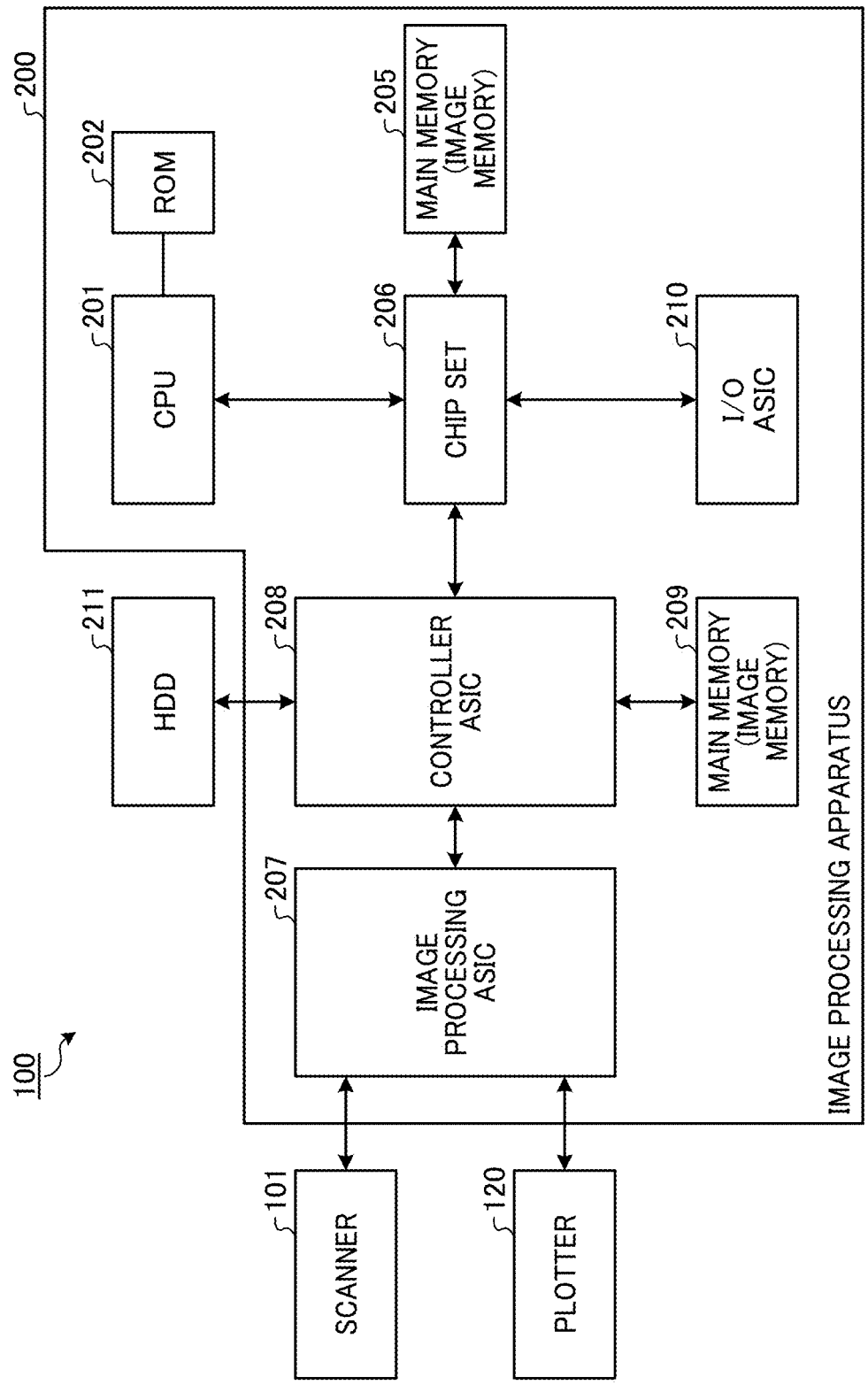
FIG. 3 is a block diagram illustrating a hardware configuration of the image forming apparatus.

FIG. 3 is a block diagram illustrating a hardware configuration of the image forming apparatus 100. As illustrated in FIG. 3, the image forming apparatus 100 includes an image processing apparatus 200 that performs predetermined processing on a document image read by the scanner 101 and outputs the processed image as image data to the plotter 120. The scanner 101, the ADF 102, and the image processing apparatus 200 constitute a tilt correction device and a reading device.

The image processing apparatus 200 includes a central processing unit (CPU) 201, a read only memory (ROM) 202, a main memory 205, a chipset 206, an image processing ASIC 207, a controller ASIC 208, a main memory 209, and an input/output (I/O) ASIC 210. The ASIC is an abbreviation for application specific integrated circuit.

The CPU 201 controls the image forming apparatus 100. The main memory 205 is a frame memory (image memory) that is used as a work area for expanding programs (applications, OS printer driver, and other programs) for the CPU 201 to control the image forming apparatus 100 and temporarily stores image data to be handled. The chipset 206 is used together with the CPU 201 to control the controller ASIC 208 and the I/O ASIC 210 to access the main memory 205.

The programs to be executed by the image forming apparatus 100 of the present embodiment may be provided in files in an installable format or an executable format that are recorded on computer-readable recording media such as a compact disc (CD)-ROM, a flexible disk (FD), a CD-recordable (R), and a digital versatile disk (DVD).

The programs to be executed by the image forming apparatus 100 of the present embodiment may be stored on a computer connected to a network such as the Internet and provided by being downloaded via the network. The programs to be executed by the image forming apparatus 100 of the present embodiment may be provided or distributed via a network such as the Internet.

The scanner 101 has a function of reading image data to be subjected to copy processing and image data to be output to an external interface. The plotter 120 has a function of printing image data stored in the main memory 209.

The image processing ASIC 207 performs image processing on image data read by the scanner 101 and outputs the image data to the controller ASIC 208. The image processing ASIC 207 also performs image processing on image data from the controller ASIC 208 to be printable at the plotter 120 and sends the image data in accordance with the print timing of the plotter 120.

The controller ASIC 208 uses the main memory 205 over the chipset 206 to rotate and edit image data handled by the image forming apparatus 100, accumulates in a hard disk drive (HDD) 211, and transmits and receives image data to and from the image processing ASIC 207. The main memory 209 is used as an image memory in which the controller ASIC 208 performs image processing. The HDD 211 is a storage used to temporarily store image data having undergone image processing.

The I/O ASIC 210 is an external interface for providing the image forming apparatus 100 with additional functions. For example, the I/O ASIC 210 includes interfaces such as a network interface, universal serial bus (USB), secure digital (SD) card, operation unit, serial peripheral interface (SPI), inter-integrated circuit (I2C), and document width sensors 85 (width detection sensors SN1 to SN5), a hardware accelerator for accelerating image processing, an encryption processing circuit, and the like.

Next, the hardware configuration of the client PC 300 is described.

Figure 4:
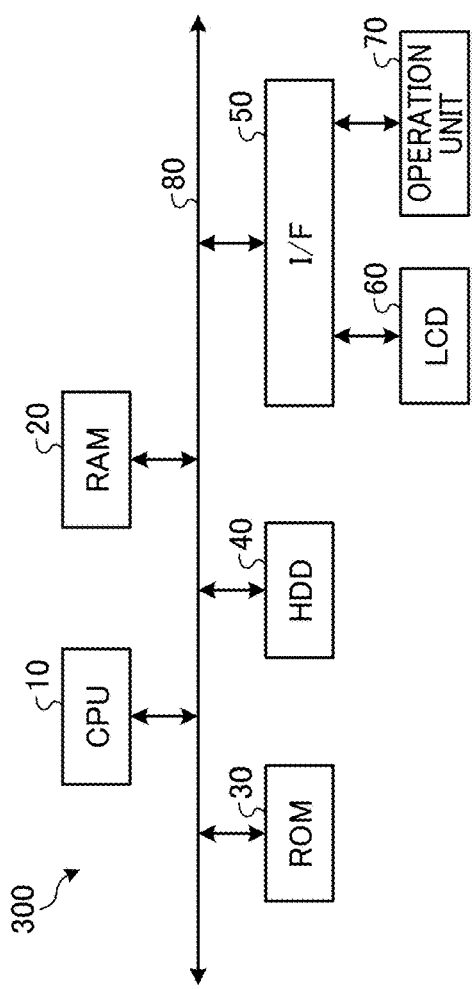
FIG. 4 is a block diagram of a hardware configuration of a client personal computer (PC)

FIG. 4 is a block diagram illustrating a hardware configuration of the client PC 300. In the following description, the hardware configuration of the client PC 300 is described using a hardware configuration of a general PC or the like as an example.

As illustrated in FIG. 4, the client PC 300 includes a central processing unit (CPU) 10, a random access memory (RAM) 20, a read-only memory (ROM) 30, a hard disk drive (HDD) 40, and an interface (I/F) 50 that are connected via a bus 80. A liquid crystal display (LCD) 60 and an operation unit 70 are connected to the I/F 50.

The CPU 10 is an arithmetic unit and controls the entire operation of the client PC 300. The RAM 20 is a volatile storage medium that allows data to be read and written at high speed. The CPU 10 uses the RAM 20 as a work area for data processing. The ROM 30 is a non-volatile read only storage medium and stores programs, such as firmware. The HDD 40 is a nonvolatile storage medium that allows data to be read and written, and stores an operating system (OS), various control programs, application programs, printer drivers, and the like.

The I/F 50 connects the bus 80 to various hardware components, the network 500, and the like for control. That is, the I/F 50 is an interface for the client PC 300 to communicate with other devices such as the image forming apparatus 100 via the network 500. The LCD 60 is a visual user interface for the user to check various information. The operation unit 70 is a user interface, such as a keyboard or a mouse, for a user to input information to the client PC 300.

In such a hardware configuration, a program stored in a storage medium such as the ROM 30, the HDD 40, or an optical disk is read into the RAM 20, and the CPU 10 performs an operation according to the program loaded into the RAM 20, thereby configuring a software control unit. A combination of the software controller configured as described above and the hardware configures a functional block that implements functions of the client PC 300 according to the present embodiment.

Such a program to be executed on the client PC 300 according to the present embodiment is recorded and provided in a computer-readable recording medium, such as a compact disc-read only memory (CD-ROM), a flexible disk (FD), a compact disc-recordable (CD-R), or a digital versatile disk (DVD) as a file of an installable or executable format.

The program executed by the client PC 300 according to the present embodiment may be stored on a computer connected to a network, such as the Internet, and provided so as to be downloaded via the network. The program executed by the client PC 300 according to the present embodiment may be provided or distributed via a network such as the Internet.

Next, functions performed by the printing system are described. Here, in the overall configuration diagram of the printing system 1000 in FIG. 1, a description is given using the image processing apparatus 200 and the client PC 300. However, in some embodiments, any information processing apparatus such as the print server 400 may be used instead of the client PC 300. The functions performed by the image processing apparatus 200 may be arranged in an information processing apparatus such as the client PC 300 or the print server 400.

Figure 5:
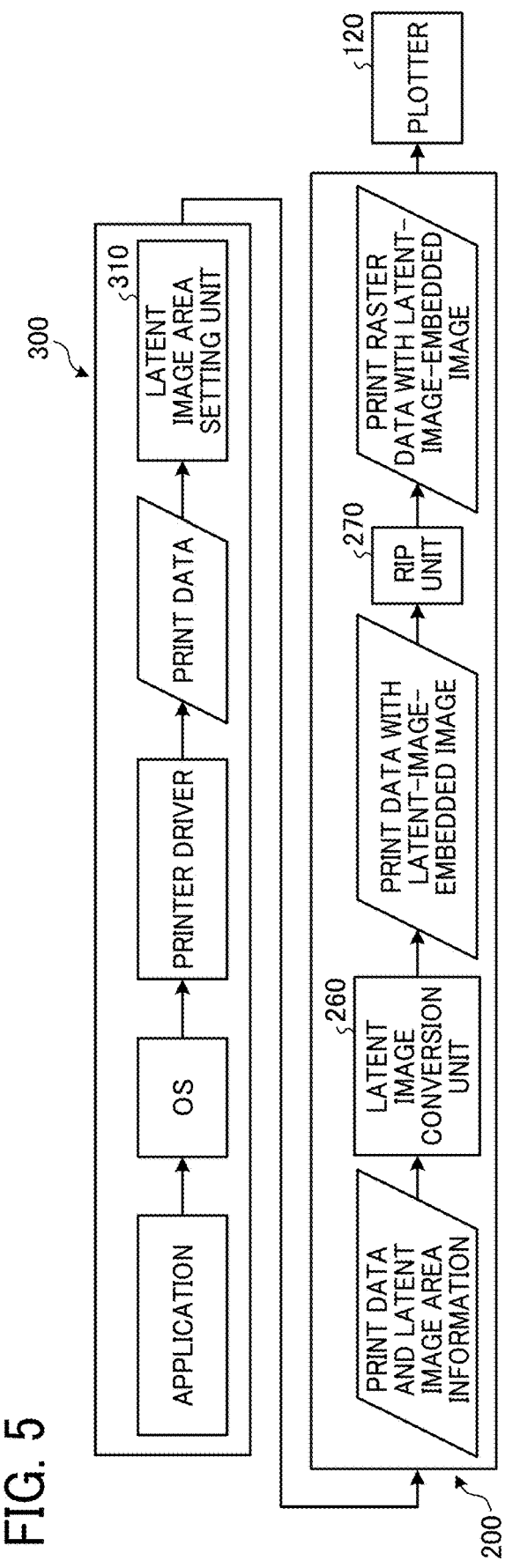
FIG. 5 is a functional block diagram of functions in the printing system.

FIG. 5 is a functional block diagram illustrating functions in the printing system. Among the functions performed by the client PC 300, characteristic functions according to the present embodiment are described here.

The image processing apparatus 200 has a function of embedding an image represented by a two-dimensional code (quick response (QR) code (registered trademark)) as a latent image in a background image.

The latent image here refers to image information that is difficult to visually recognize and can be detected only in a specific observation environment. An infrared latent image, which is described later, refers to image information that is difficult to visually recognize under visible light and can be detected only by a sensing device that reacts to infrared light. A latent-image-embedded image, which is described later, refers to an image in which invisible information including an infrared latent image is embedded. The background image refers to a visible image in which a latent image is to be embedded. In the case of observing the latent-image-embedded image, only the background image can be observed. The latent image also refers to image information to be embedded as invisible information in the background image.

Figure 6:
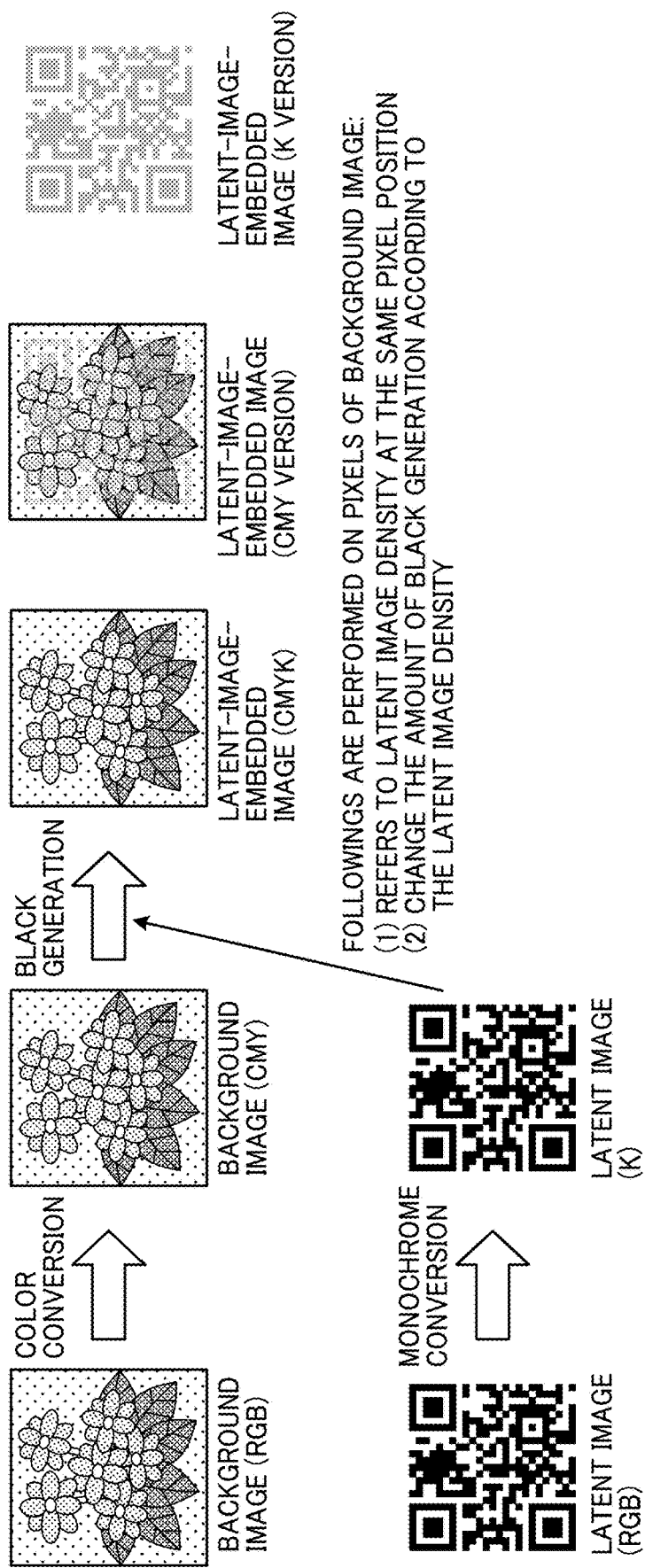
FIG. 6 is a diagram illustrating an example of a latent image composition method.

FIG. 6 is a diagram illustrating an example of a latent image composite method. As illustrated in FIG. 6, an arbitrary background image composed of RGB is subjected to a conversion from RGB to CMY. A latent image is subjected to a monochrome conversion by, for example, converting the RGB components into luminance values. In the background image converted into CMY, black generation is not performed by a black generation table with constant pixels but the black generation amount is changed in accordance with the latent image density at the same pixel positions. For example, if the latent image at the same position as the background pixel is a white pixel, black generation is not performed and only the CMY values are left. If the latent image at the same position as the background pixel is a black pixel, a process for increasing the black level is performed to create a CMYK image having undergone black generation. The black processing table is supposed to be adjusted so that the same color reproduction is performed in the low black level and the high black level. In FIG. 6, the embedding method for the background image composed of RGB has been described. In the case where the background image is a CMYK image, CMYK signals may be converted into CMY signals or RGB signals once, and the CMY signals or RGB signals may be converted into a latent-image-embedded image using the method of FIG. 6.

If such an CMYK image is printed by the image forming apparatus 100, there is no difference in color between the low black-level portion and the high black-level portion. Thus, only the original background image can be recognized by the observation with the naked eye under visible light. However, the black generation amount is dynamically changed based on the density of the latent image. Thus, focusing on a K image illustrated in FIG. 6, an image equivalent to the original latent image is generated.

Color materials of cyan, magenta, and yellow not containing carbon exhibit high transmission properties under infrared light, whereas black color materials using carbon black characteristically exhibits high absorbency under infrared light. When the latent-image-embedded image is checked by the infrared sensing device, the CMY toner becomes transparent and only the printing portions with the K toner are detected as black. Therefore, the latent image information can be identified by the infrared sensing device. In this manner, adjusting the combination of color materials different in optical characteristics to an arbitrary background image makes it possible to embed latent image information. Here, the K toner image holds latent image information, and the CMY toner image serves as a mask for concealing the latent image.

In relation to the present embodiment, a method for adjusting the black generation amount is described. However, in order to embed a latent image by a combination of coloring materials different in optical characteristics, there is also a method to composite a black mask with a background image and adjust the amount of K in the black mask. The image composition can be performed by either of these methods. In either of the methods, the latent image is held by adjusting the combination of the color materials different in optical characteristics. Thus, the generated latent-image-embedded image can be held in an image format in which the amounts of the color materials to be printed are retainable.

For example, when the image is supposed to be printed by the image forming apparatus 100 that prints in cyan, magenta, yellow, and black, the image is held in the CMYK image format. When color materials other than the above are used (for example, light cyan and light magenta), it is necessary to hold the image in an image format in which all the amounts of the color materials can be recorded.

In the present embodiment, the method for embedding an infrared latent image using the color material of carbon black with high infrared absorption and the color materials of cyan, magenta, and yellow with high infrared transmittance is taken as an example. Otherwise, an ultraviolet latent image may be embedded using a combination of color materials exhibiting high absorption and transmission of ultraviolet components.

In relation to the first embodiment, a description is given as to a technique for adding a latent-image-embedded image to print data generated by a printer driver by extracting image information to be a latent image (latent image information) from the print data and compositing the extracted image information with an arbitrary background image (background information).

Figure 7:
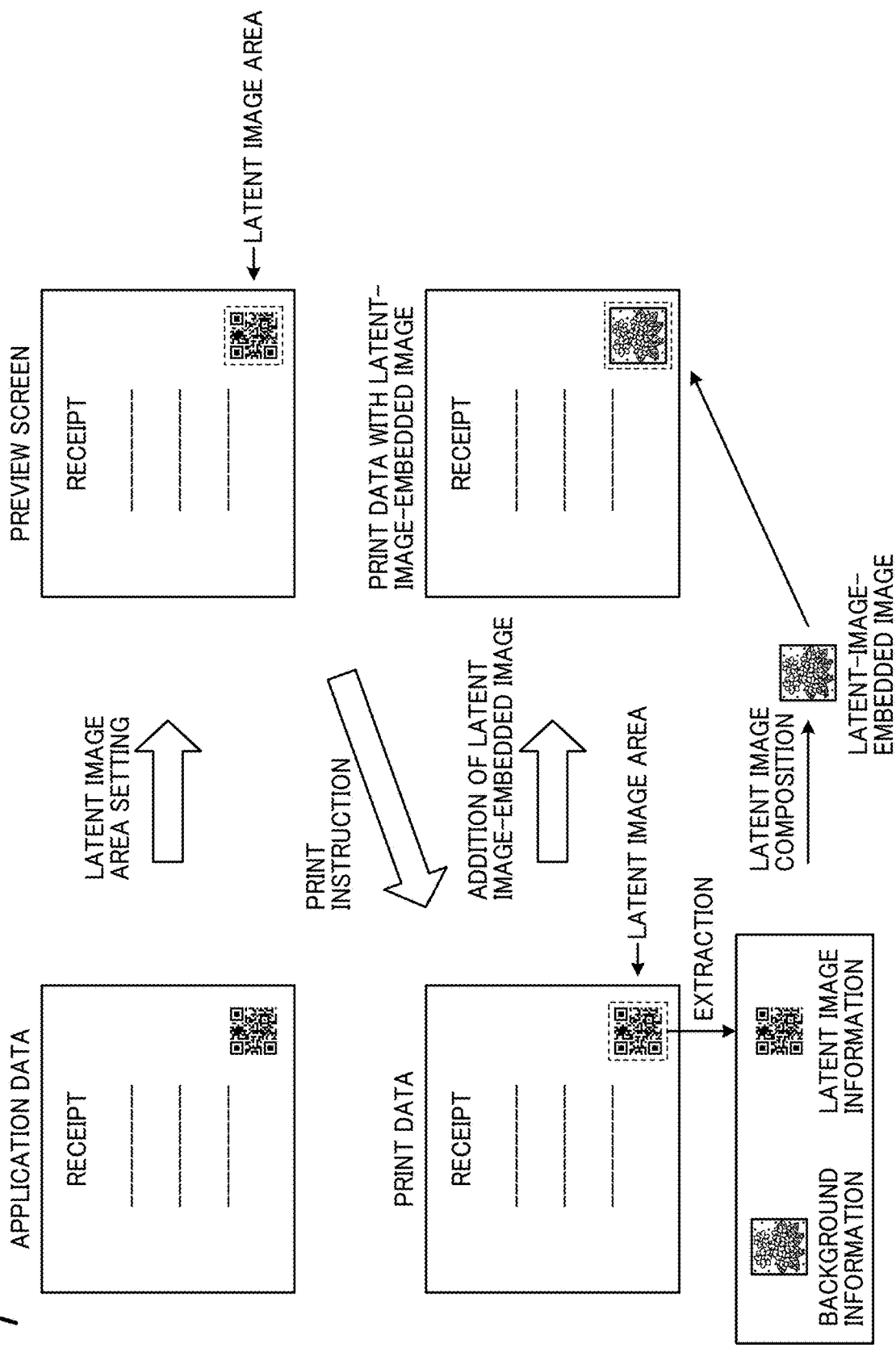
FIG. 7 is a diagram illustrating an outline of a process according to the first embodiment.

FIG. 7 is a diagram illustrating an outline of a process according to the first embodiment. As illustrated in FIG. 7, a case where a quick response (QR) code generated by application data is to be concealed as invisible information in the background will be considered. The QR code is generated by an application for creating receipts, and has money amount information embedded as code information therein.

When a printer driver for latent image printing is specified from the application and a print instruction is issued, a print preview screen is started. On the print preview screen, the user can select information to be concealed as a latent image. When the latent image is selected and a print instruction is issued, the object selected as the latent image information is extracted from the print data, the latent image information is composited with arbitrary background information. Thus, the latent image information is converted into a latent-image-embedded image and printed. In this manner, the user can conceal any information in the existing application as a latent image.

The QR code concealed as a latent image cannot be detected visually or by a normal RGB-based scanner, but can be detected and decoded only by an infrared sensing device. For this reason, it is possible to create a QR code that is very difficult to falsify or forge. In addition, in a copying process by a general copying machine, a latent image will be destroyed without being copied, which allows determination on copying and counterfeiting.

As illustrated in FIG. 5, the client PC 300 includes a latent image area setting unit 310. The image processing apparatus 200 includes a latent image conversion unit 260 and a raster image processing (RIP) unit 270.

As illustrated in FIG. 5, when a print instruction is issued, the application of the client PC 300 generates print data via the rendering application programming interface (API) of the operation system and the printer driver graphics function of the client PC 300. The print data is generally in a command data format called page description language (PDL) that can be interpreted by the image forming apparatus 100.

The latent image area setting unit 310 interprets the print data generated by the printer driver of the client PC 300 and renders a print image on the screen of the client PC 300 as a print preview screen. The user can select an area to be concealed as latent image information on the print preview screen.

FIG. 8 is a diagram illustrating an example of holding the selected latent image area information. As illustrated in FIG. 8, the area selected on the preview screen is held as latent image area information (area specification information in coordinates) in the print image. The latent image area information can be set at a plurality of positions for each page.

Since the print data described in the general PDL includes the coordinate data and the drawing object data, the latent image area information can be easily extracted by extracting the object of the coordinates corresponding to the condition. Needless to say, print data described in raster data (composed of coordinate data and pixel values) can be easily extracted.

In the present embodiment, the latent image area information selected on the preview screen is held, but the latent image area information in the print data may be designated by color information for converting an object described in a specific color into the latent image area information, an object number in the PDL, or the like. The specification by latent image area information causes a restriction that information other than the latent image information cannot be arranged in the latent image area. However, there is no color restriction in creating a document. In the case of specification by color information, a specific color is converted into latent image area information so that there is a restriction that the color cannot be used in a document but there is no restriction on the area.

The latent image area information specified by the latent image area setting unit 310 is transmitted to the image processing apparatus 200 together with the print data, and is passed to the latent image conversion unit 260.

Next, the latent image conversion unit 260 is described.

Figure 9:
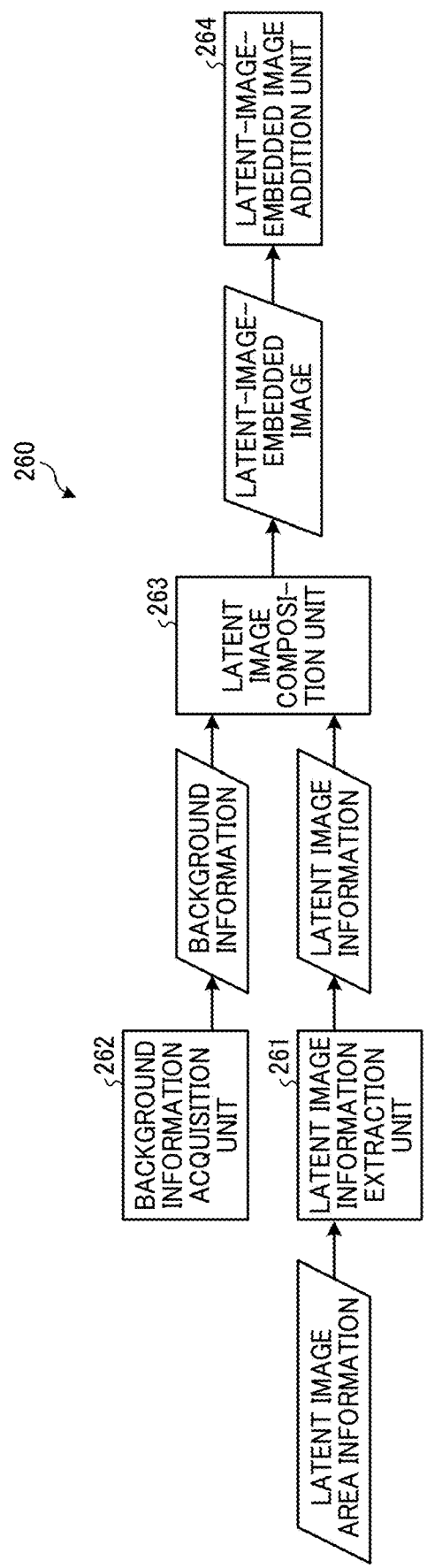
FIG. 9 is a diagram illustrating an outline of a process performed by a latent image conversion unit.

FIG. 9 is a diagram illustrating an outline of a process performed by the latent image conversion unit 260. As illustrated in FIG. 9, the latent image conversion unit 260 includes a latent image information extraction unit 261, a background information acquisition unit 262, a latent image composition unit 263, and a latent-image-embedded image addition unit 264.

The latent image information extraction unit 261 extracts an object at a position specified by the latent image area information from the print data as latent image information (latent image).

The background information acquisition unit 262 acquires background information. The background image may be a predetermined image. Otherwise, the user may register an arbitrary background image for each print job.

The latent image composition unit 263 turns the object of the latent image information extracted by the latent image information extraction unit 261 into an image by vector data, and composites the latent image with the arbitrary background image to create a latent-image-embedded image. The latent image composition process refers to a method for compositing an infrared latent image that is invisible under normal light and can be detected only by an infrared device, using a combination of color materials different in optical characteristics.

The latent-image-embedded image addition unit 264 adds the latent-image-embedded image to the print data by arranging the latent-image-embedded image at the position where the latent image information was present. The print data with the latent-image-embedded image needs to be added to the print data in a format capable of holding a combination of color materials having different optical characteristics. For example, when an infrared latent image is to be embedded with a combination of color materials of cyan, magenta, and yellow coloring materials exhibiting high infrared transmission and a color material of carbon black exhibiting high infrared absorption, the latent-image-embedded image needs to be held in the print data in CMYK color space format. This is because, when converted into the RGB color space, information about the combination amount of the color materials is lost, so that the latent image may be destroyed. A PDL corresponding to a CMYK color space such as PostScript (registered trademark) needs to be used for print data.

Figure 10:
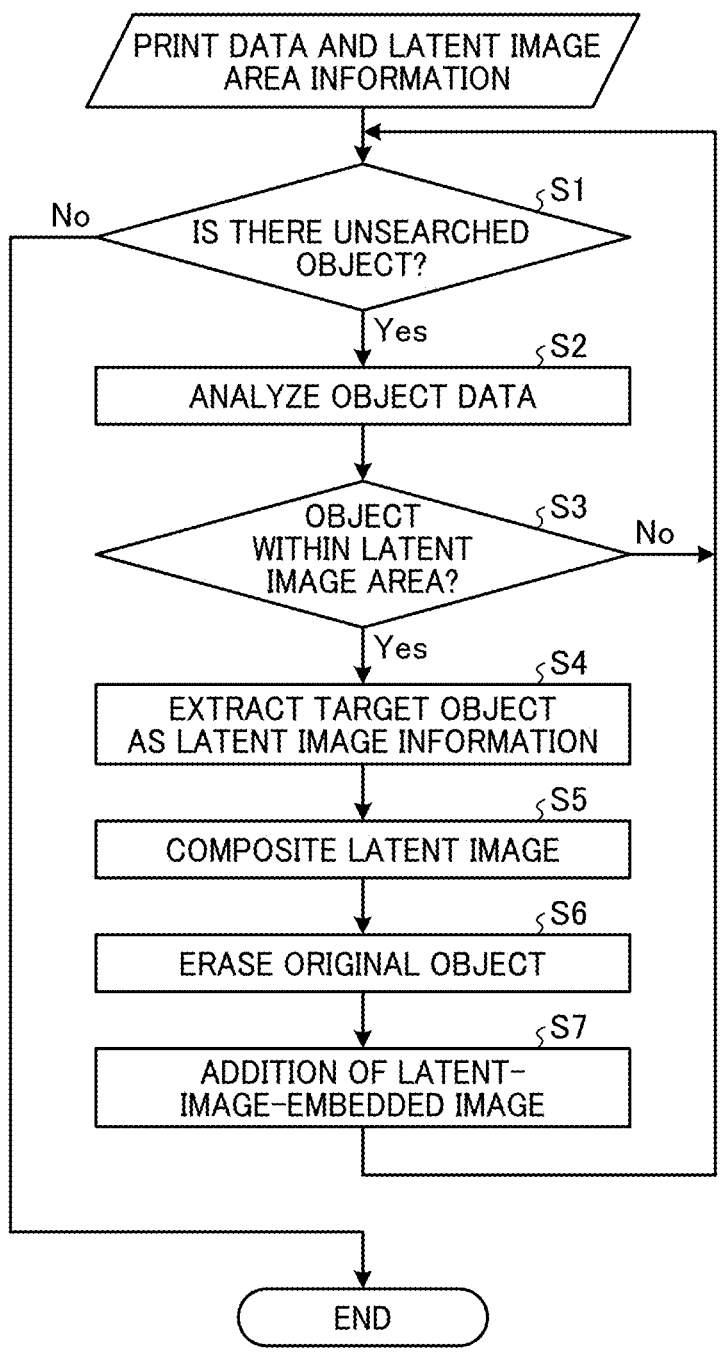
FIG. 10 is a flowchart illustrating a flow of a latent image conversion process performed by a latent image conversion unit.

FIG. 10 is a flowchart illustrating a flow of a latent image conversion process performed by the latent image conversion unit 260. In the process described below, when the print data is described in PDL data, an object in the latent image area information is extracted and converted into print data with the latent image-embedded image, and the latent image-embedded image data is added to the PDL data.

In general, the PDL data is mainly composed of objects to be rendered such as image objects converted into raster data, graphics objects such as lines and figures, and character objects described in Font data, and coordinate data indicating the printing positions of the objects.

As illustrated in FIG. 10, when there is an unsearched object to be rendered (Yes in step S1), the latent image information extraction unit 261 analyzes the coordinate position data of the object to be rendered (step S2), and determines whether the object is included in the specified latent image area information (step S3).

When there is no object to be rendered that has been unsearched, that is, when the rendering of all the objects is completed (No in step S1), the latent image information extraction unit 261 terminates the process.

When determining that the object is included in the specified latent image area information (Yes in step S3), the latent image information extraction unit 261 extracts the object to be rendered from the latent image area information as the latent image information (step S4).

When not determining that the object is included in the specified latent image area information (No in step S3), the latent image information extraction unit 261 returns to step S1.

When the object is composed of vector data of characters and graphics, the latent image composition unit 263 turns the object into an image, and composites the resultant latent image with arbitrary background information acquired by the background information acquisition unit 262, thereby to generate a latent-image-embedded image (step S5).

The latent-image-embedded image addition unit 264 deletes the original object information from the PDL data (step S6), and adds the latent-image-embedded image to the area where the object to be a latent image was present (step S7). The latent-image-embedded image needs to be held in the form of a CMYK color space, and PDL data corresponding to the CMYK color space needs to be used in addition to the RGB or Gray color space. In the case of using color materials other than cyan, magenta, yellow, and black on the image forming apparatus 100, the latent image needs to be held in the image format in which the respective print amounts of the color materials can be accurately expressed.

The latent image conversion unit 260 generates the print data with the latent-image-embedded image in the manner as described above.

Next, the raster image processing (RIP) unit 270 is described. The RIP unit 270 creates raster data of the entire surface of the printing sheet for the print data with the latent-image-embedded image described in the PDL to which the latent-image-embedded image is added. More particularly, the RIP unit 270 converts all the objects in the print data with the latent-image-embedded image into raster images, and renders the raster images in a frame memory that can hold image data of the entire print page.

The objects described in RGB are converted into raster images after the color conversion from RGB to CMYK. The latent-image-embedded image is rendered at a predetermined position in the frame memory without color conversion of the CMYK data. The means for interpreting print data described in PDL or the like and generating raster images to be printed on printing paper is generally called RIP.

The plotter 120 outputs the printed matter in which the latent image is embedded by outputting the raster data rendered in the frame memory on the printing paper.

In this manner, according to the present embodiment, extracting latent image information from print data generated by a printer driver, converting the latent image information into a latent-image-embedded image, and adding the latent-image-embedded image to the print data make it possible to convert document data generated by an arbitrary application into a document with security in which arbitrary information in the original document is set as a latent image and print the document, without modification of the application.

Further, according to the present embodiment, the conversion into a latent-image-embedded image and the addition to the print data are separated from the operations of the application, so that the user does not need to modify or change the existing application and can conceal only the desired contents as a latent image without changing the existing work flow.

Second Embodiment

Next, a second embodiment is described.

In the second embodiment, a latent image area setting unit 310 is implemented to set latent image area information separately from the printing operation, which is different from the first embodiment in which the latent image area setting unit 310 is implemented to set latent image area information after the issue of a print instruction. Hereinafter, in relation to the second embodiment, a description of the components identical to those in the first embodiment is omitted, and the components different from those in the first embodiment are described.

Figure 11:
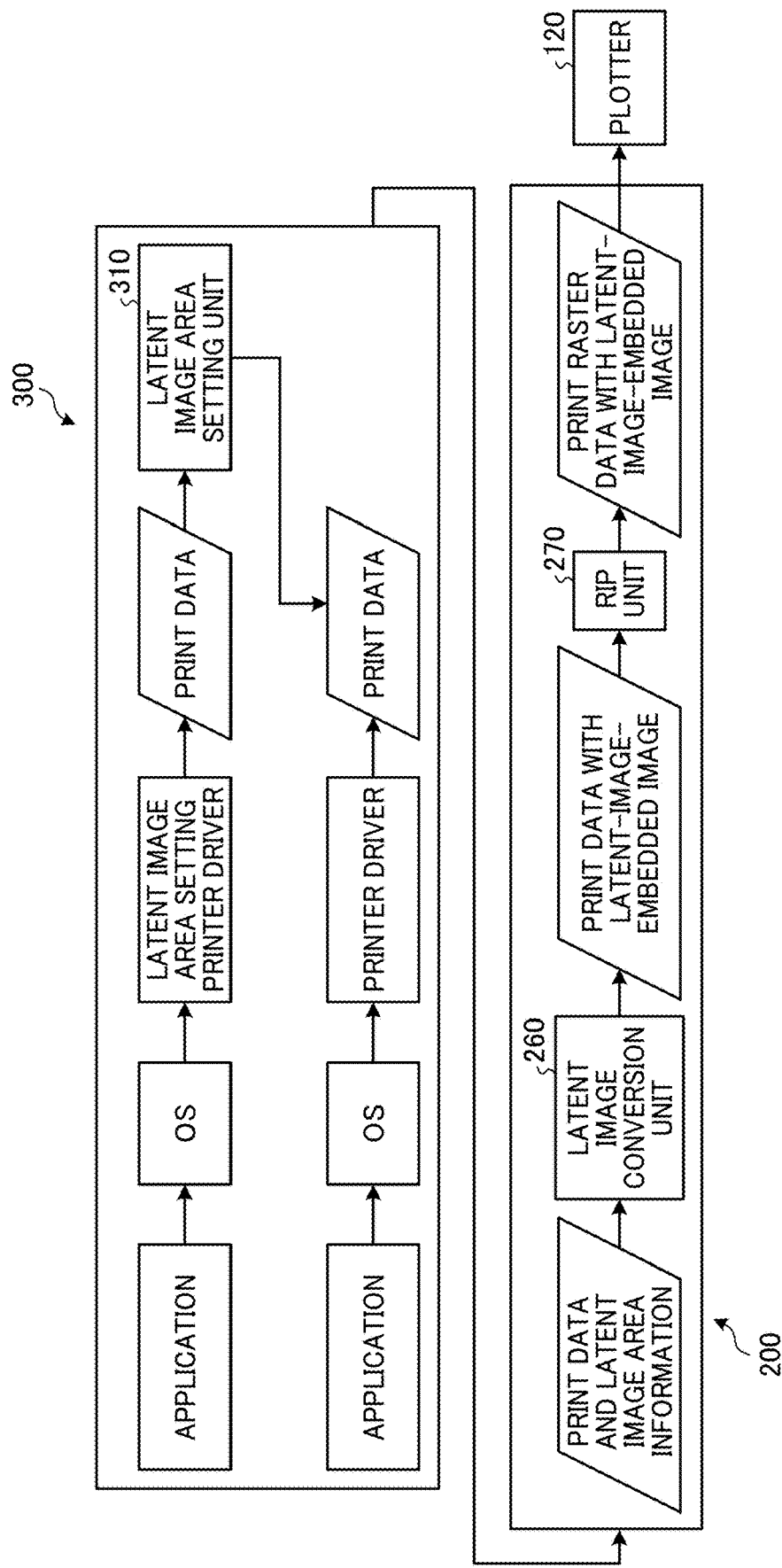
FIG. 11 is a functional block diagram illustrating functions in the printing system according to a second embodiment.

FIG. 11 is a functional block diagram illustrating functions in the printing system according to the second embodiment. As illustrated in FIG. 11, in the client PC 300 according to the second embodiment, a printer driver used for printing and a printer driver for specifying latent image information are separately configured. In this case, in order to specify latent image information, the user specifies a printer driver for specifying a latent image and issues a print instruction from the application. When the printer driver for specifying the latent image is specified and a print instruction is issued, the rendering API of the operation system is called from the application to generate the print data via the graphics function of the printer driver.

The latent image area setting unit 310 interprets the print data and renders a print image on the client PC 300 as a print preview screen. The user selects an area to be concealed as a latent image on the preview screen. An area to be concealed as latent image information is held in the client PC 300 as latent image area information in the print data. When the storage of the latent image area information is completed, the printing operation by the driver for specifying a latent image is completed, and printing is not actually executed.

To print the raster data for printing with the latent image-embedded image, the user specifies a printer driver corresponding to the latent image embedding function from the application and issues a print instruction. When a print instruction is issued, print data is similarly generated and transmitted to the image processing apparatus 200 together with the latest latent image area information on the client PC 300 and passed to the latent image conversion unit 260.

As described above, according to the present embodiment, the latent image area information does not necessarily need to be specified during the print flow. The latent image information may be separately provided in the latent image area setting unit 310 or predetermined latent image area information may be constantly held by a fixed parameter. In such a case, the user does not need to call the latent image area setting unit 310 and set the latent image area every time printing is performed, and thus can reduce the time and effort of setting. Even predetermined fixed latent image area information is sufficiently effective when the format of the document generated by the application is the same and only the contents are different.

Regarding the fixed latent image area information, the predetermined latent image area information may be stored not only in the client PC 300 but also in the image processing apparatus 200. In such a case, even if the client PC 300 does not have the latent image area setting unit 310, the conversion to the latent-image-embedded image can be performed by only the function of the image processing apparatus 200.

Third Embodiment

Next, a third embodiment is described.

The third embodiment differs from the first and second embodiments in that a latent image is extracted from data obtained by converting PDL data into raster data for a plotter 120. Hereinafter, in relation to the third embodiment, description of the components identical to those in the first and second embodiments will be omitted, and the components different from those in the first and second embodiments will be described.

Figure 12:
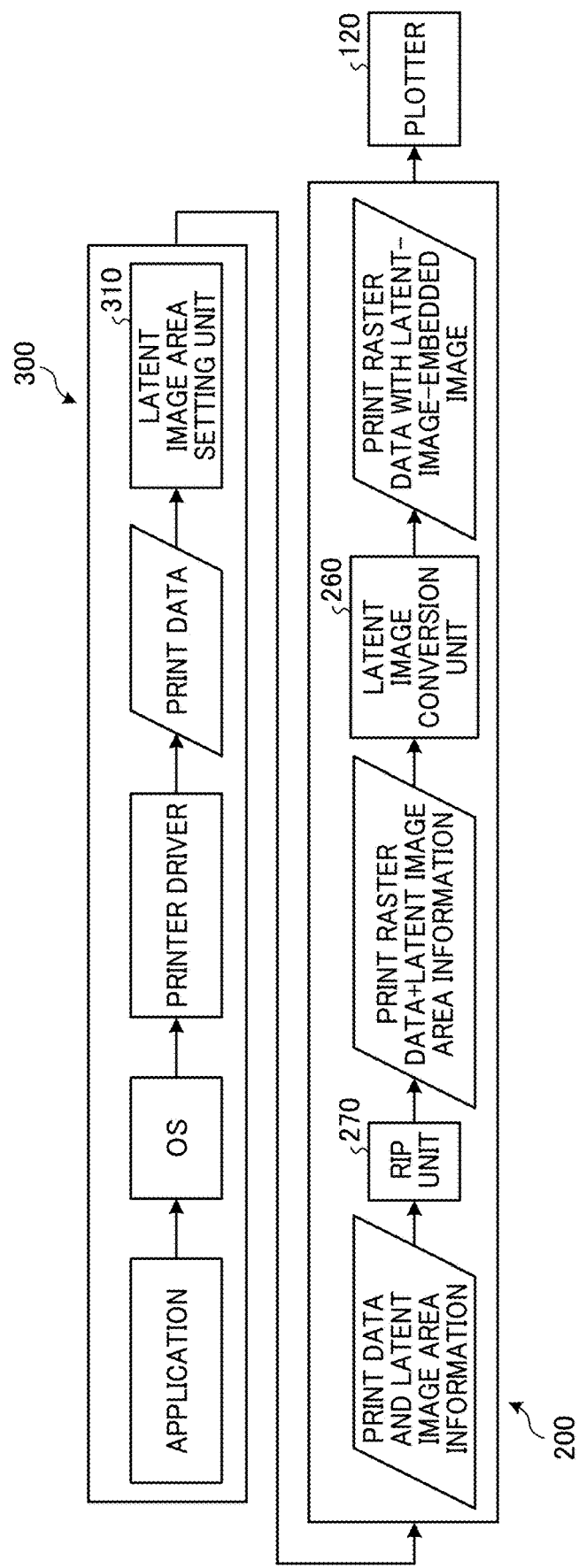
FIG. 12 is a functional block diagram illustrating functions in the printing system according to a third embodiment.

FIG. 12 is a functional block diagram illustrating functions in the printing system according to the third embodiment. As illustrated in FIG. 12, in the printing system (the image processing apparatus 200 and the client PC 300) according to the third embodiment, latent image area information specified by a latent image area setting unit 310 is transmitted to the image processing apparatus 200 together with the PDL data and passed to a RIP unit 270.

For the PDL data, the RIP unit 270 creates raster data of the entire printing paper, and transfers the raster data to a latent image conversion unit 260 together with the latent image area information specified by the latent image area setting unit 310. The raster data here is assumed to be expressed in the CMYK color space.

The latent image conversion unit 260 extracts a latent image from the data obtained by converting the PDL data into the raster data for the plotter 120 and generates print raster data with a latent-image-embedded image.

Figure 13:
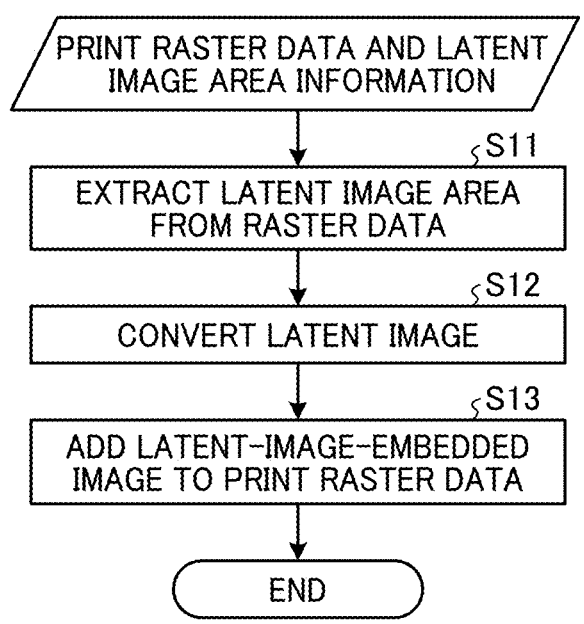
FIG. 13 is a flowchart illustrating a flow of a latent image conversion process performed by a latent image conversion unit.

FIG. 13 is a flowchart illustrating a flow of a latent image conversion process performed by the latent image conversion unit 260. As illustrated in FIG. 13, the latent image conversion unit 260 extracts an image of an area corresponding to the latent image area from the converted print raster data (step S11).

Next, the latent image conversion unit 260 composites the extracted image with an arbitrary background image acquired by a background information acquisition unit 262 to generate a latent-image-embedded image (step S12).

Next, the latent image conversion unit 260 overwrites the area extracted as the latent image information from the raster data with the latent image-embedded image to generate print raster data with the latent image-embedded image to which the latent image-embedded image is added (step S13).

The plotter 120 prints the raster data and outputs the printed matter in which the latent image is embedded.

As described above, according to the present embodiment, it is possible to convert document data generated by an arbitrary application into a document with security in which arbitrary information in the original document is set as a latent image and print the document, without modification of the application.

Fourth Embodiment

Next, a fourth embodiment is described.

The fourth embodiment is different from the first to third embodiments in providing a latent image conversion function to a RIP unit 270 that interprets PDL data and generates raster data, so that information specified as a latent image in print data is converted into a latent-image-embedded image. Hereinafter, in relation to the fourth embodiment, description of the components identical to those in the first to third embodiments will be omitted, and the components different from those in the first to third embodiments will be described.

Figure 14:
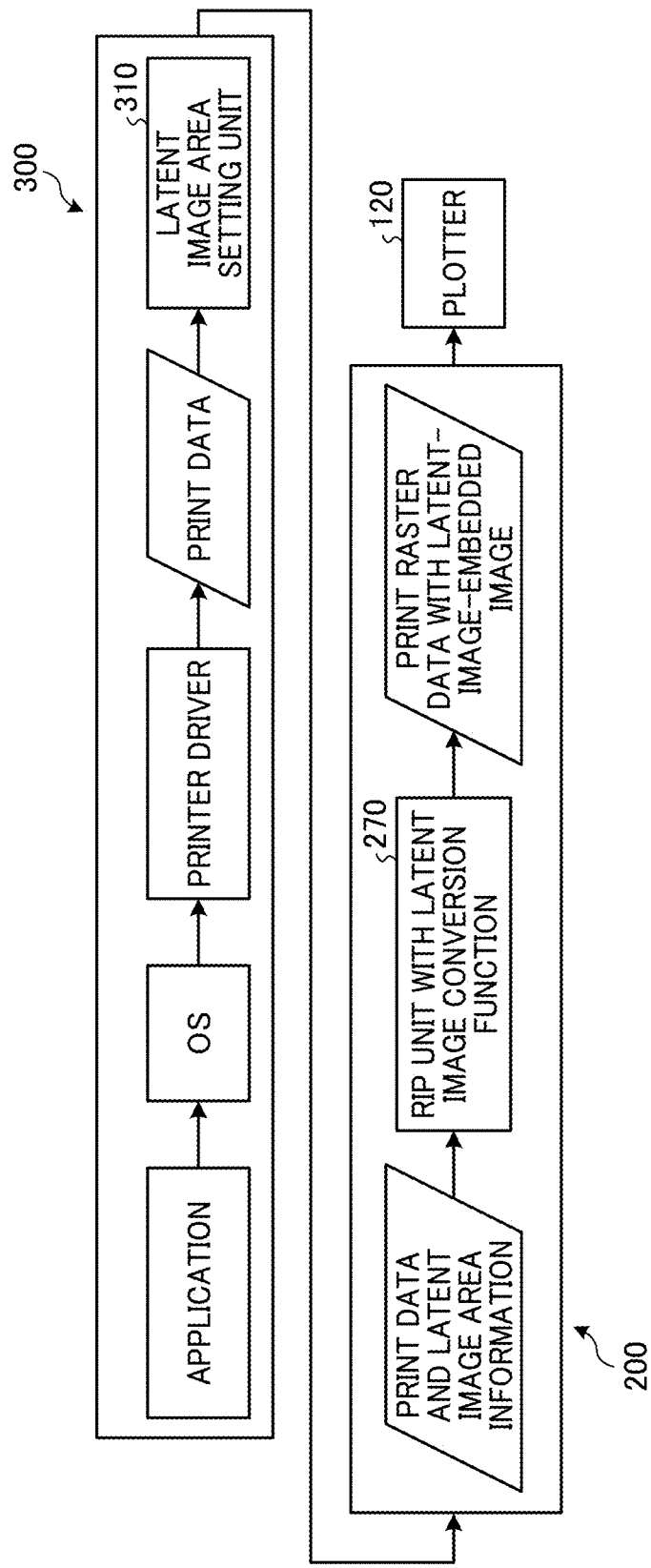
FIG. 14 is a functional block diagram illustrating functions in the printing system according to a fourth embodiment.

FIG. 14 is a functional block illustrating functions in the printing system according to the fourth embodiment. As illustrated in FIG. 14, in the printing system (the image processing apparatus 200 and the client PC 300) according to the fourth embodiment, latent image area information specified by a latent image area setting unit 310 is passed together with print data described in PDL to the RIP unit 270 with the latent image conversion function.

The RIP unit 270 with the latent image conversion function receives the print data described in PDL and the latent image area information. As described above, in general, the PDL data is mainly composed of objects to be rendered such as image objects converted into raster data, graphics objects such as lines and figures, and character objects described in Font data, and coordinate data indicating the printing positions of the objects.

The RIP unit 270 with the latent image conversion function creates raster images of objects to be rendered in the PDL by interpreting the coordinate positions and the rendering command, and renders the raster images in the frame memory.

Figure 15:
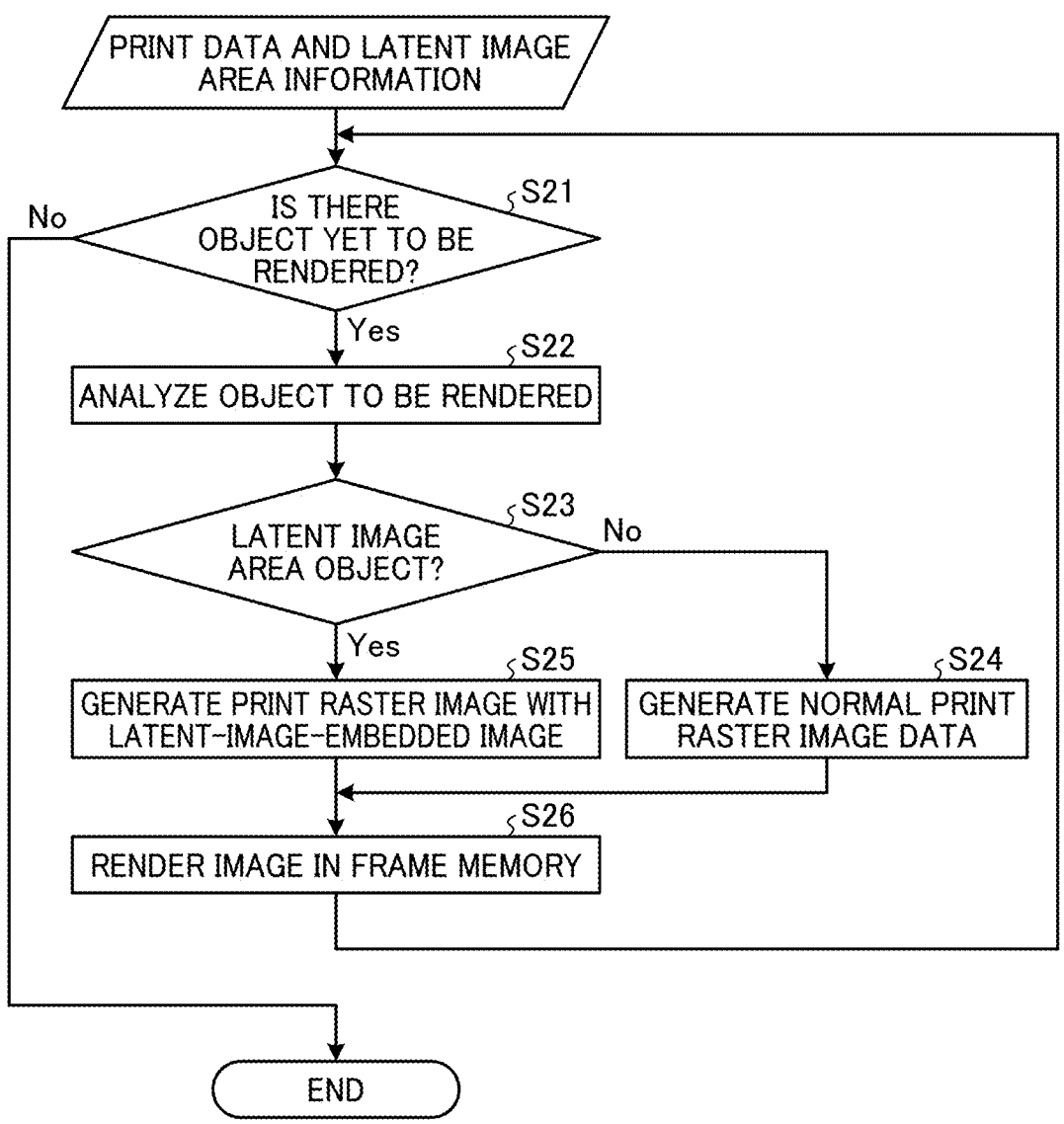
FIG. 15 is a flowchart illustrating a flow of a latent image conversion process performed by a raster image processing (RIP) unit having a latent image conversion function.

FIG. 15 is a flowchart illustrating a flow of a latent image conversion process performed by the RIP unit 270 with the latent image conversion function. As illustrated in FIG. 15, when there is an unsearched object to be rendered (Yes in step S21), the RIP unit 270 with the latent image conversion function analyzes the coordinate position data of the object to be rendered (step S22), and determines whether the object is included in the specified latent image area information (step S23).

When there is no unsearched object to be rendered, that is, when rendering of all the objects is completed (No in step S21), the RIP unit 270 with the latent image conversion function terminates the process.

When not determining that the object is included in the specified latent image area information (No in step S23), the RIP unit 270 with the latent image conversion function generates raster data for normal printing (step S24), and renders a raster image in the frame memory (step S26).

On the other hand, when determining that the object is included in the specified latent image area information (Yes in step S23), the RIP unit 270 with the latent image conversion function composites the object in the latent image area with an arbitrary background image acquired by the background information acquisition unit 262 and performs latent image conversion to generate raster data with a latent image-embedded image (step S25), and renders the latent image-embedded image in the frame memory (step S26).

As described above, according to the present embodiment, it is possible to convert document data generated by an arbitrary application into a document with security in which arbitrary information in the original document is set as a latent image and print the document, without modification of the application.

As described above in relation to the first to third embodiments, print data in any format can be converted into print raster data with a latent image-embedded image so that print data as PDL data or raster image data can be handled with. As described above in relation to the fourth embodiment, it is possible to provide the latent image conversion function to the RIP unit 270 that renders PDL data in the frame memory and converts the same into a raster image.

The portable document format (PDF) format and the XML paper specification (XPS) format, which are widely spread as document browsing file formats, are also some kinds of PDL, and these data formats are also applicable to the print data that can be handled with by the present invention. These data formats are composed of objects to be rendered and coordinate data, and a latent-image-embedded image can be added to the print data by the method described above in relation to the first to fourth embodiments.

Such a PDF file or XPS file is not necessarily for print data but may have any property as a format for storing a document on the client PC 300 or the print server 400. A PDF file or XPS file can be generated by a general-purpose application on the client PC 300 or the print server 400 without using a printer driver.

Since the generated PDF data and XPS data also have the property of PDL, they can be transferred directly to the plotter 120 and printed without using a printer driver. Therefore, it is possible to construct not only a system for printing using a printer driver but also a system in which extraction of latent image information and embedding of a latent image are performed on PDF or XPS data saved in the client PC 300 or the print server 400 and the latent-image-embedded image is directly printed by the arbitrary plotter 120 without using a printer driver.

Fifth Embodiment

Next, a fifth embodiment will be described.
In the fifth embodiment, background information is acquired from print data and arbitrary latent image information is embedded in the background information, which is different from the first to fourth embodiments in which latent image information is acquired from print data and is composited with arbitrary background so that the latent-image-embedded image is composited with the print data. Hereinafter, in relation to the fifth embodiment, description of the components identical to those in the first to fourth embodiments will be omitted, and the components different from those in the first to fourth embodiments will be described.

Figure 16:
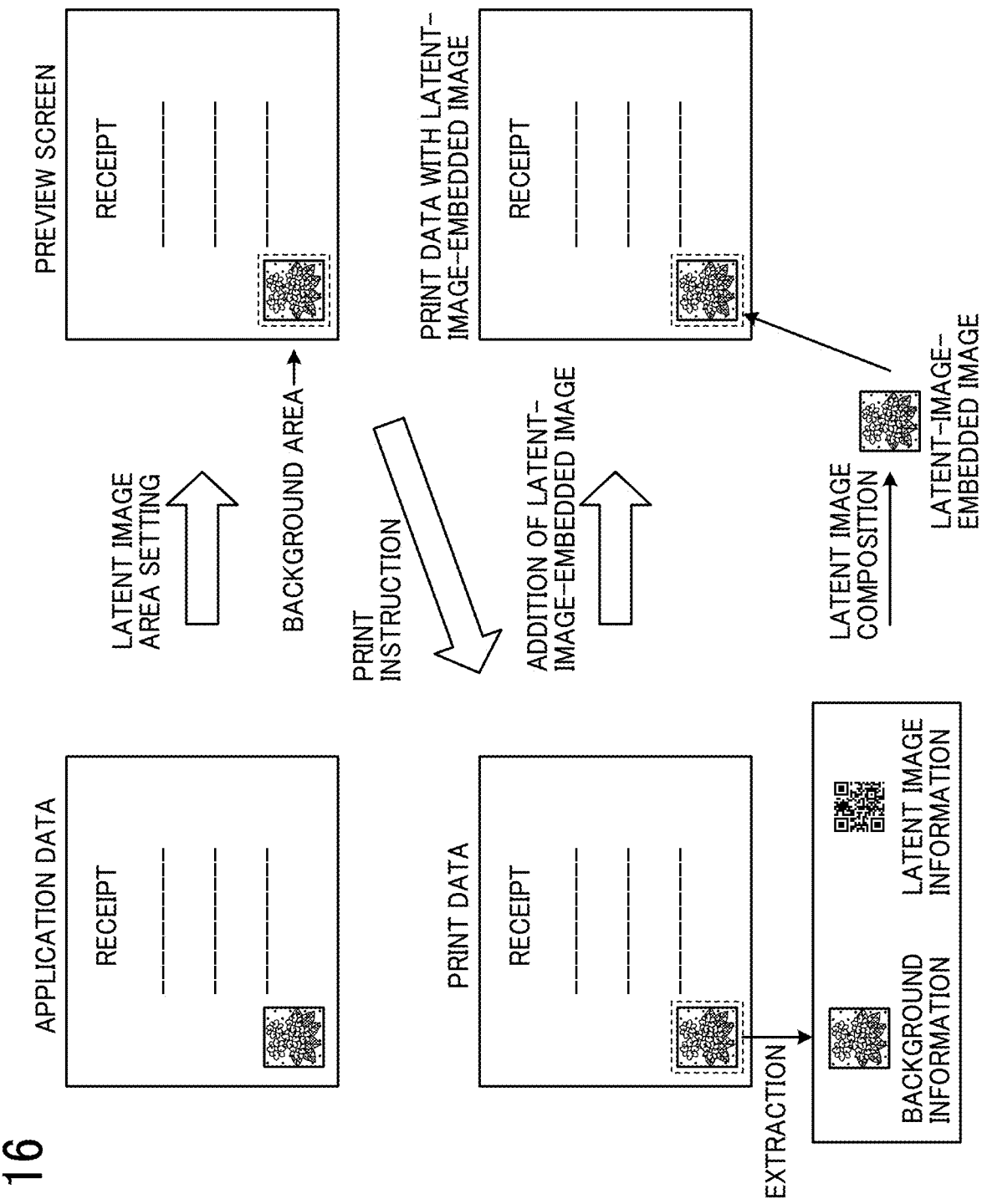
FIG. 16 is a diagram illustrating an outline of a process according to a fifth embodiment.

FIG. 16 is a diagram illustrating an outline of a process according to the fifth embodiment. As illustrated in FIG. 16, a case where arbitrary latent image information is to be concealed in a background image generated by application data. The corresponding background image was generated by an application for making receipts. As an example of using the present embodiment, a company logo image is generated by a document creation application, and latent image information is embedded in the logo image as the background image so that it is possible to prevent a user from feeling uncomfortable. In this case, the latent image information to be embedded in the present embodiment does not necessarily need to be information generated by a document creation application.

When a printer driver for latent image printing is specified from a background image application and a print instruction is issued, a print preview screen is started. On the print preview screen, the user can select image information to be used as background information for embedding a latent image. When the background is selected and a print instruction is issued, the object selected as the background image information is extracted from the print data, arbitrary latent image information is composited with the background image information, the print data is converted into a latent-image-embedded image in which the latent image information is masked with the extracted background, and the latent-image-embedded image is printed. In this way, the user can embed a latent image in arbitrary background image information in an existing application.

As described above, by using an image generated by a document creation application as the background, the user can embed the latent image information without breaking the layout of the created document.

Figure 17:
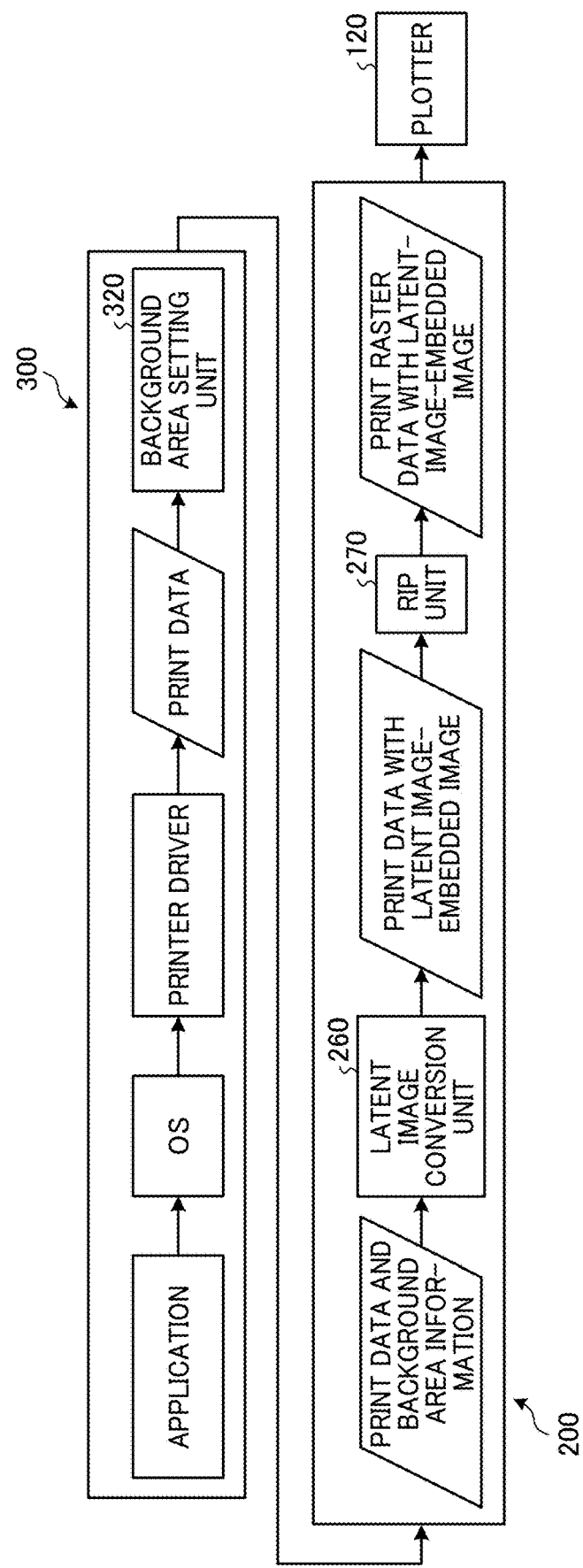
FIG. 17 is a functional block diagram illustrating functions in the printing system according to a fifth embodiment.

FIG. 17 is a functional block diagram illustrating functions in the printing system according to the fifth embodiment. As illustrated in FIG. 17, the printing system (the image processing apparatus 200 and the client PC 300) includes a background area setting unit 320 instead of the latent image area setting unit 310 illustrated in FIG. 5.

As illustrated in FIG. 17, when a print instruction is issued in an application, the application generates print data via the rendering API of the operation system and the printer driver graphics function. The print data is generally in a command data format called page description language (PDL) that can be interpreted by the image forming apparatus 100.

The background area setting unit 320 interprets the print data generated by the printer driver and renders a print image on the screen of the client PC 300 as a print preview screen. The user can select the area to be used as the background information for concealing a latent image on the print preview screen.

FIG. 18 is a diagram illustrating an example of holding selected background area information. As illustrated in FIG. 18, the area selected on the preview screen is held as background area information (area specification information in coordinates) in the print image. The background area information can be set at a plurality of places in each page.

In the present embodiment, the background is held as the background area information selected on the preview screen. The background area information in the print data may be specified and held by color-related information indicating that an object described in a specific color is to be used as background area information or by the object number in the PDL.

The background area information specified by the background area setting unit 320 is passed to a latent image conversion unit 260 together with the print data.

Next, the latent image conversion unit 260 is described.

Figure 19:
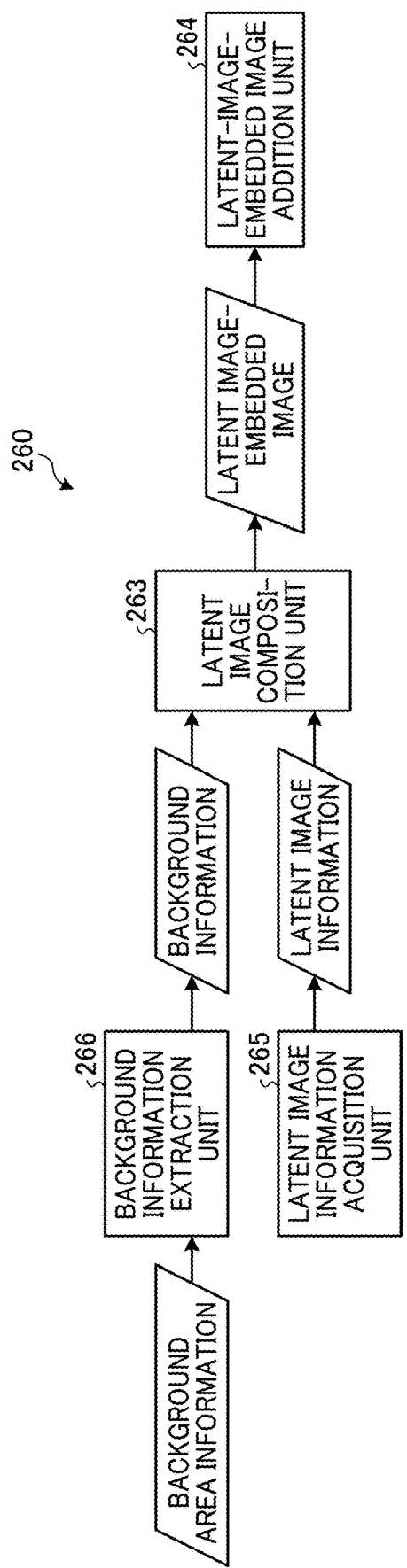
FIG. 19 is a diagram illustrating an outline of a process performed by a latent image conversion unit.

FIG. 19 is a diagram illustrating an outline of a process performed by the latent image conversion unit 260. As illustrated in FIG. 19, the latent image conversion unit 260 includes a latent image information acquisition unit 265, a background information extraction unit 266, a latent image composition unit 263, and a latent-image-embedded image addition unit 264.

The latent image information acquisition unit 265 acquires latent image information. The latent image information may be predetermined fixed information, or the user may register arbitrary latent image information for each print job.

The background information extraction unit 266 extracts an object at a position specified by the background area information from the print data as background information (background image).

The latent image composition unit 263 turns the object of the background information extracted by the background information extraction unit 266 into an image by vector data, and composites the background image with the arbitrary latent image information to create a latent-image-embedded image. The latent image composition process refers to a method for compositing an infrared latent image that is invisible under normal light and can be detected only by an infrared device, using a combination of color materials different in optical characteristics.

The latent-image-embedded image addition unit 264 adds the latent-image-embedded image to the print data by arranging the latent-image-embedded image at the coordinate position where the background image in the print data was present. It is desirable that the latent image-embedded image data be added to the print data in a format that can hold a combination of color materials different in optical characteristics. For example, when an infrared latent image is to be embedded with a combination of color materials of cyan, magenta, and yellow coloring materials exhibiting high infrared transmission and a color material of carbon black exhibiting high infrared absorption, the latent-image-embedded image is desirably held in the print data in CMYK color space format. This is because, when converted into the RGB color space, information about the combination amount of the color materials is lost, so that the latent image may be destroyed.

Figure 20:
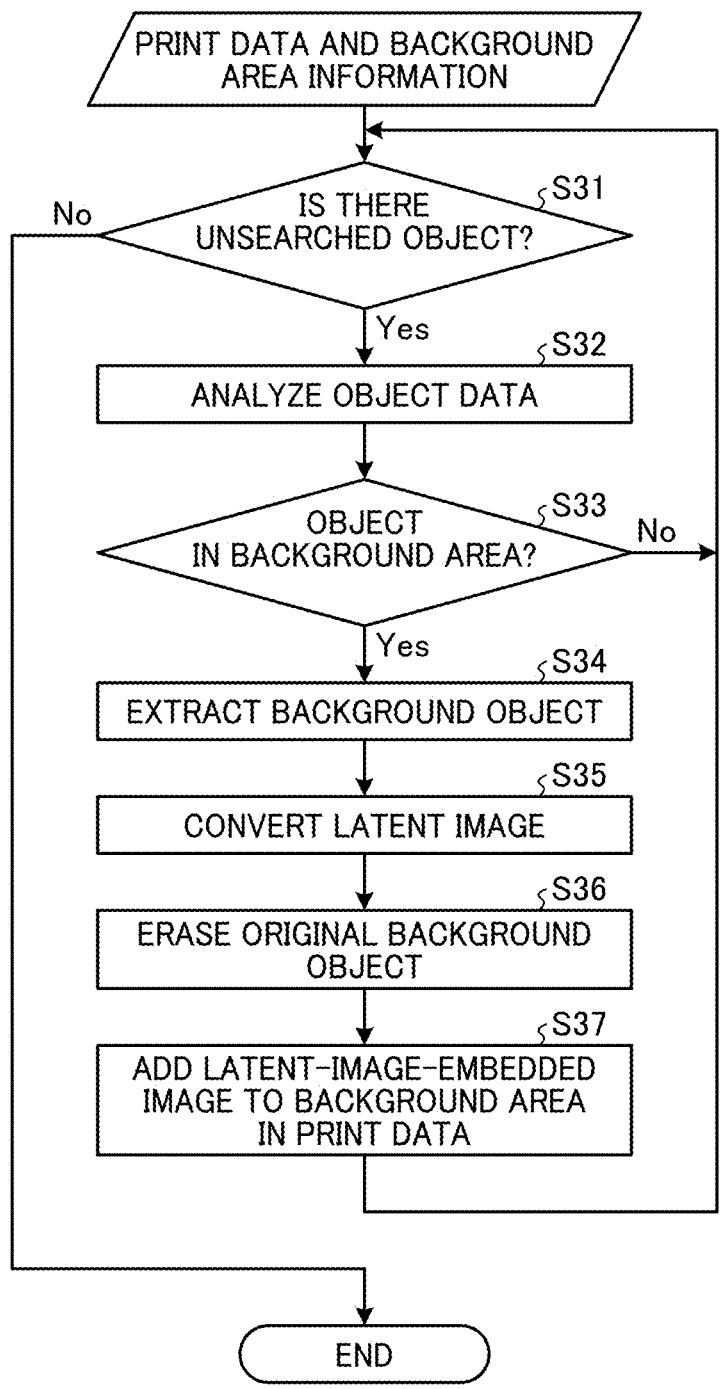
FIG. 20 is a flowchart illustrating a flow of a latent image conversion process performed by a latent image conversion unit.

FIG. 20 is a flowchart illustrating a flow of a latent image conversion process performed by the latent image conversion unit 260. In the process described below, when the print data is described in PDL data, an object in the background area information is extracted and converted into a latent image-embedded image, and the latent-image-embedded image is added to the PDL data.

In general, the PDL data is mainly composed of objects to be rendered such as image objects converted into raster data, graphics objects such as lines and figures, and character objects described in Font data, and coordinate data indicating the printing positions of the objects.

As illustrated in FIG. 20, when there is an unsearched object to be rendered (Yes in step S31), the background information extraction unit 266 analyzes the coordinate position data of the object to be rendered (step S32), and determines whether the object is included in the specified background area information (step S33).

When there is no object to be rendered that has been unsearched, that is, when the rendering of all the objects is completed (No in step S31), the background information extraction unit 266 terminates the process.

When determining that the object is included in the specified background area information (Yes in step S33), the background information extraction unit 266 extracts the object to be rendered from the background area information as the background information (step S34).

When not determining that the object is included in the specified background area information (No in step S33), the background information extraction unit 266 returns to step S31.

When the object is composed of vector data of characters and graphics, the latent image composition unit 263 turns the object into an image, and composites the resultant image with arbitrary latent image information acquired by the latent image information acquisition unit 265, thereby to generate a latent-image-embedded image (step S35).

The latent-image-embedded image addition unit 264 deletes the original object information from the PDL data (step S36), and adds the latent-image-embedded image to the background area where the object to be a latent image was present (step S37). The latent-image-embedded image needs to be held in the form of a CMYK color space. As the PDL data, PDL data corresponding to a CMYK color space needs to be used in addition to a color space such as RGB or Gray. In the case of using color materials other than cyan, magenta, yellow, and black on the image forming apparatus 100, the latent image needs to be held in the image format in which the respective print amounts of the color materials can be accurately expressed. A PDL corresponding to a CMYK color space such as PostScript (registered trademark) needs to be used for print data.

The latent image conversion unit 260 generates the print data with the latent-image-embedded image in which the latent image information is embedded in the arbitrary background image in the manner as described above.

Next, the raster image processing (RIP) unit 270 is described. The RIP unit 270 creates print raster data with the latent-image-embedded image of the entire surface of the printing sheet as the print data with the latent-image-embedded image described in the PDL to which the latent-image-embedded image is added. More particularly, the RIP unit 270 converts all the objects in the print data with the latent-image-embedded image into raster images, and renders the raster images in a frame memory that can hold image data of the entire print page.

The objects described in RGB are converted into raster images after the color conversion from RGB to CMYK. The latent-image-embedded image is rendered at a predetermined position in the frame memory without color conversion of the CMYK data.

The plotter 120 outputs the printed matter in which the latent image is embedded by outputting the raster data rendered in the frame memory on the printing paper.

In this manner, according to the present embodiment, extracting background information from print data generated by a printer driver, converting the latent image information into a latent-image-embedded image, and adding the latent-image-embedded image to the print data make it possible to convert document data generated by an arbitrary application into a document with security in which arbitrary information in the original document is set as a background and print the document, without modifying the application and causing layout disruption in the existing document.

Further, according to the present embodiment, the conversion into a latent-image-embedded image and the addition to the print data are separated from the operations of the application, so that the user does not need to change the existing application to embed the latent image information. Therefore, it is possible to embed the latent image information without changing the existing operation flow and changing the layout of the image generated by the conventional application.

Sixth Embodiment

Next, a sixth embodiment is described.

In the sixth embodiment, a background area setting unit 320 is implemented to set background area information separately from the printing operation, which is different from the fifth embodiment in which the background area setting unit 320 is implemented to set area information after the issue of a print instruction. Hereinafter, in relation to the sixth embodiment, description of the components identical to those in the fifth embodiment will be omitted, and the components different from those in the fifth embodiment will be described.

Figure 21:
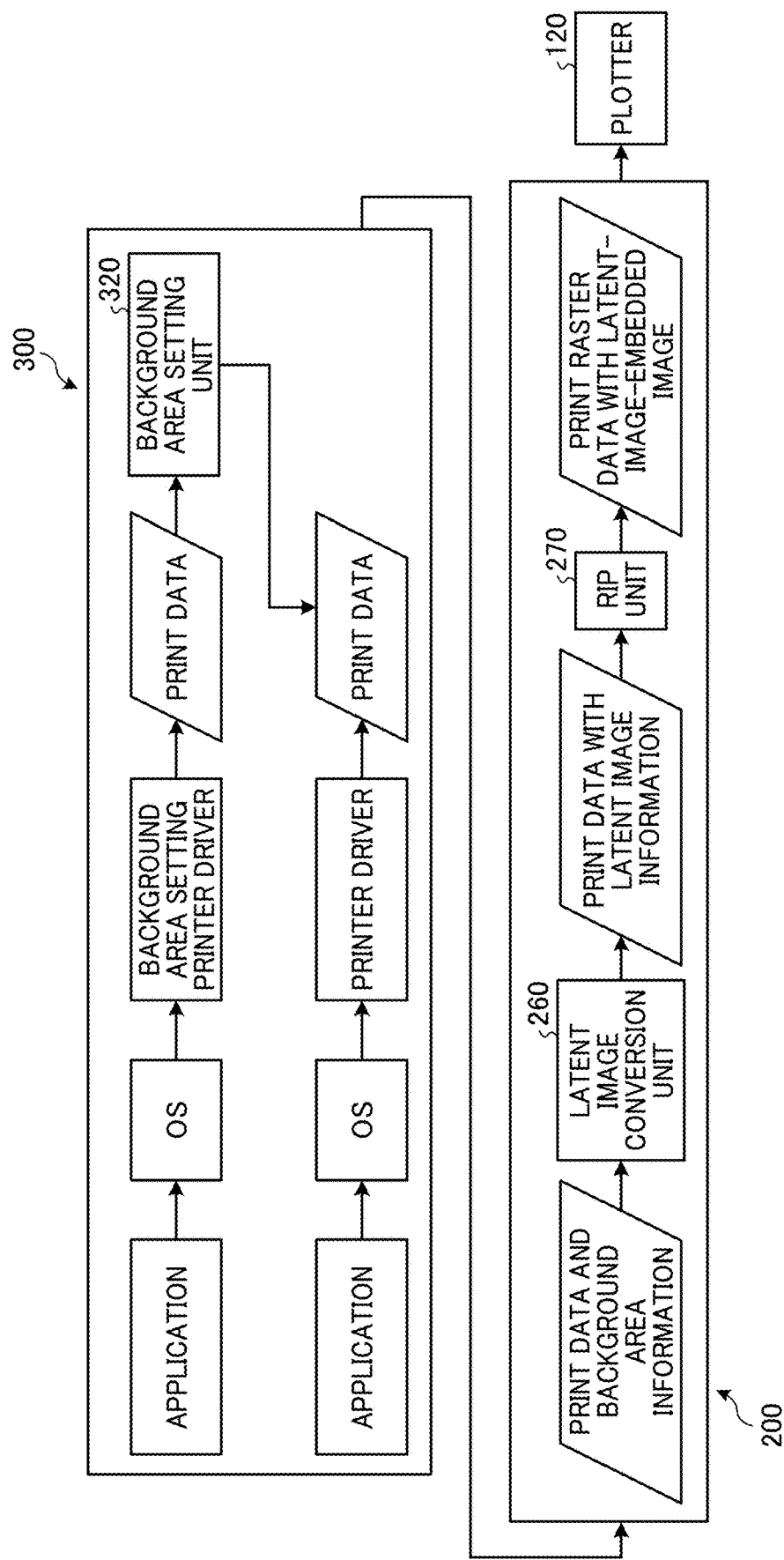
FIG. 21 is a functional block diagram illustrating functions in the printing system according to a sixth embodiment.

FIG. 21 is a functional block diagram illustrating functions of an image processing apparatus 200 according to the sixth embodiment. As illustrated in FIG. 21, in the client PC 300 according to the sixth embodiment, a printer driver used for printing and a printer driver for specifying background information are separately configured. In this case, in order to specify background information, the user specifies a printer driver for specifying a background and issues a print instruction from the application. When a printing instruction is issued by specifying a printer driver for background specification, the rendering API of the operation system is called from the application, and print data is generated via the graphics function of the printer driver.

The background area setting unit 320 interprets the print data and renders a print image on the client PC 300 as a print preview screen. The user selects an area as the background information on the preview screen. The area used as the background information is held in the client PC 300 as background area information in the print data. When the storage of the background area information is completed, the printing operation by the driver for specifying a background is completed without actual execution of printing.

To print the print raster data with the latent image-embedded image, the user specifies a printer driver corresponding to the latent image embedding function from the application and issues a print instruction. When a print instruction is issued, print data is similarly generated and transmitted to the image processing apparatus 200 together with the background image area information on the client PC 300 and passed to the latent image conversion unit 260.

As described above, according to the present embodiment, the background information does not necessarily need to be specified during the print flow. The background information may be separately provided in the background area setting unit 320 or predetermined background area information may be constantly held by a fixed parameter. In such a case, the user does not need to call the background area setting unit 320 and set the background area every time printing is performed, and thus can reduce the time and effort of setting. Even predetermined fixed background area information is sufficiently effective when the format of the document generated by the application is the same and only the contents are different.

Regarding the fixed background area information, the predetermined background area information may be stored not only in the client PC 300 but also in the image processing apparatus 200. In such a case, even if the client PC 300 does not have the background area setting unit 320, the conversion to the latent-image-embedded image can be performed by only the function of the image processing apparatus 200.

Seventh Embodiment

Next, a seventh embodiment is described.

The seventh embodiment differs from the fifth and sixth embodiments in that a latent image is extracted from data obtained by converting PDL data into raster data for a plotter 120. Hereinafter, in relation to the seventh embodiment, description of the components identical to those in the fifth and sixth embodiments will be omitted, and the components different from those in the fifth and sixth embodiments will be described.

Figure 22:
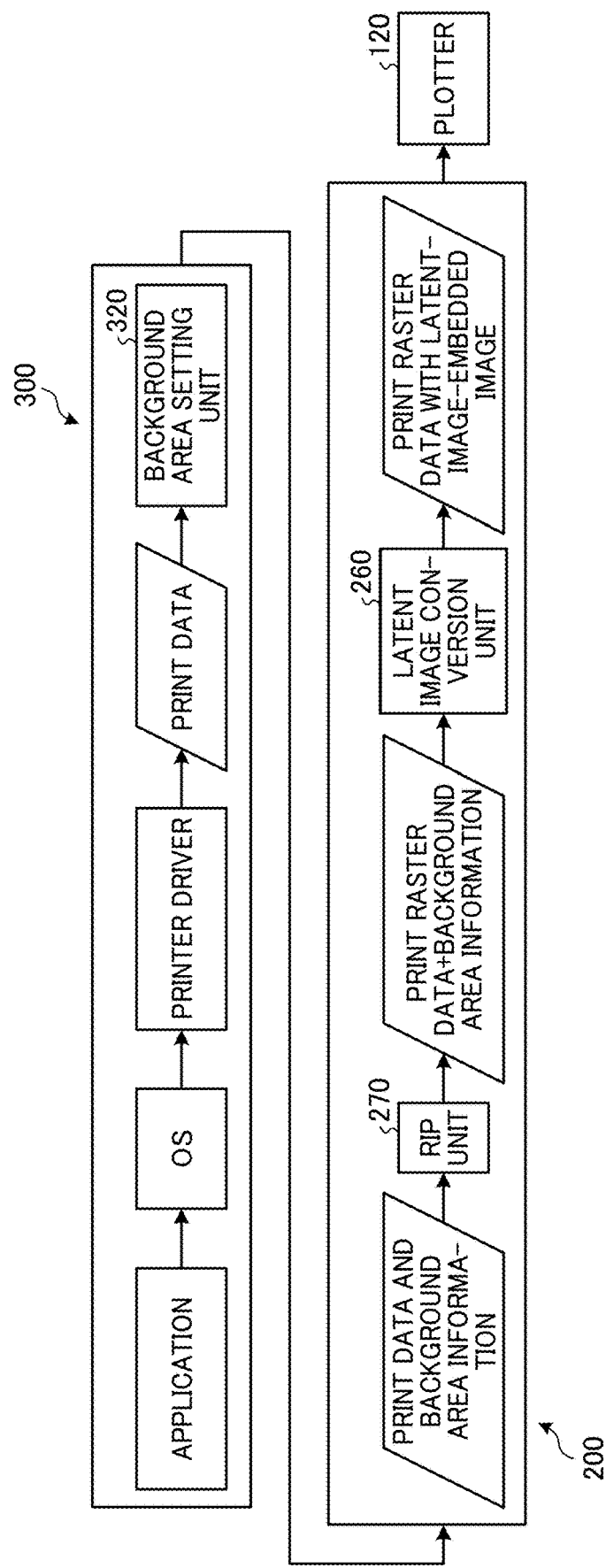
FIG. 22 is a functional block diagram illustrating functions in the printing system according to a seventh embodiment.

FIG. 22 is a functional block diagram illustrating functions in the printing system according to the seventh embodiment. As illustrated in FIG. 22, in the printing system (the image processing apparatus 200 and the client PC 300) according to the seventh embodiment, background area information specified by a background area setting unit 320 is transmitted to the image processing apparatus 200 together with the PDL data and passed to a RIP unit 270.

For the PDL data, the RIP unit 270 creates print raster data of the entire printing paper, and transfers the raster data to a latent image conversion unit 260 together with the background area information specified by the background area setting unit 320. The raster data here is assumed to be expressed in the CMYK color space.

The latent image conversion unit 260 extracts a background from the data obtained by converting the PDL data into the raster data for the plotter 120, and generates print raster data with a latent-image-embedded image.

Figure 23:
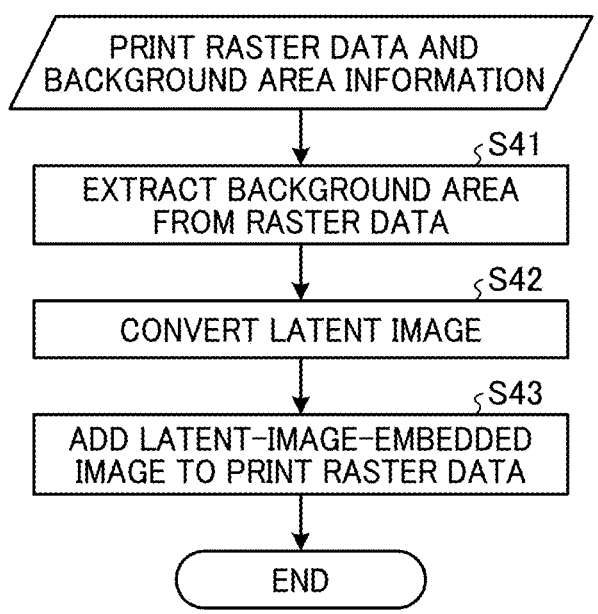
FIG. 23 is a flowchart illustrating a flow of a latent image conversion process performed by a latent image conversion unit.

FIG. 23 is a flowchart illustrating a flow of a latent image conversion process performed by the latent image conversion unit 260. As illustrated in FIG. 23, the latent image conversion unit 260 extracts an image of an area corresponding to the background area from the converted print raster data (step S41).

Next, the latent image conversion unit 260 composites the extracted image with an arbitrary latent image acquired by the latent image information acquisition unit 265 to generate a latent-image-embedded image (step S42).

Next, the latent image conversion unit 260 overwrites the area extracted as the background image information from the print raster data with the latent image-embedded image to generate print raster data with the latent image-embedded image to which the latent image-embedded image is added (step S13).

The plotter 120 prints the print raster data with the latent image-embedded image and outputs the printed matter in which the latent image is embedded.

As described above, according to the present embodiment, it is possible to convert document data generated by an arbitrary application into a document with security in which arbitrary information in the original document is set as a latent image and print the document, without modification of the application.

Eighth Embodiment

Next, an eighth embodiment is described.

The eighth embodiment is different from the fifth to seventh embodiments in providing a latent image conversion function to a RIP unit 270 that interprets PDL data and generates raster data, so that information specified as a latent image in print data is converted into a latent-image-embedded image. Hereinafter, in relation to the eighth embodiment, description of the components identical to those in the fifth to seventh embodiments will be omitted, and the components different from those in the fifth to seventh embodiments will be described.

Figure 24:
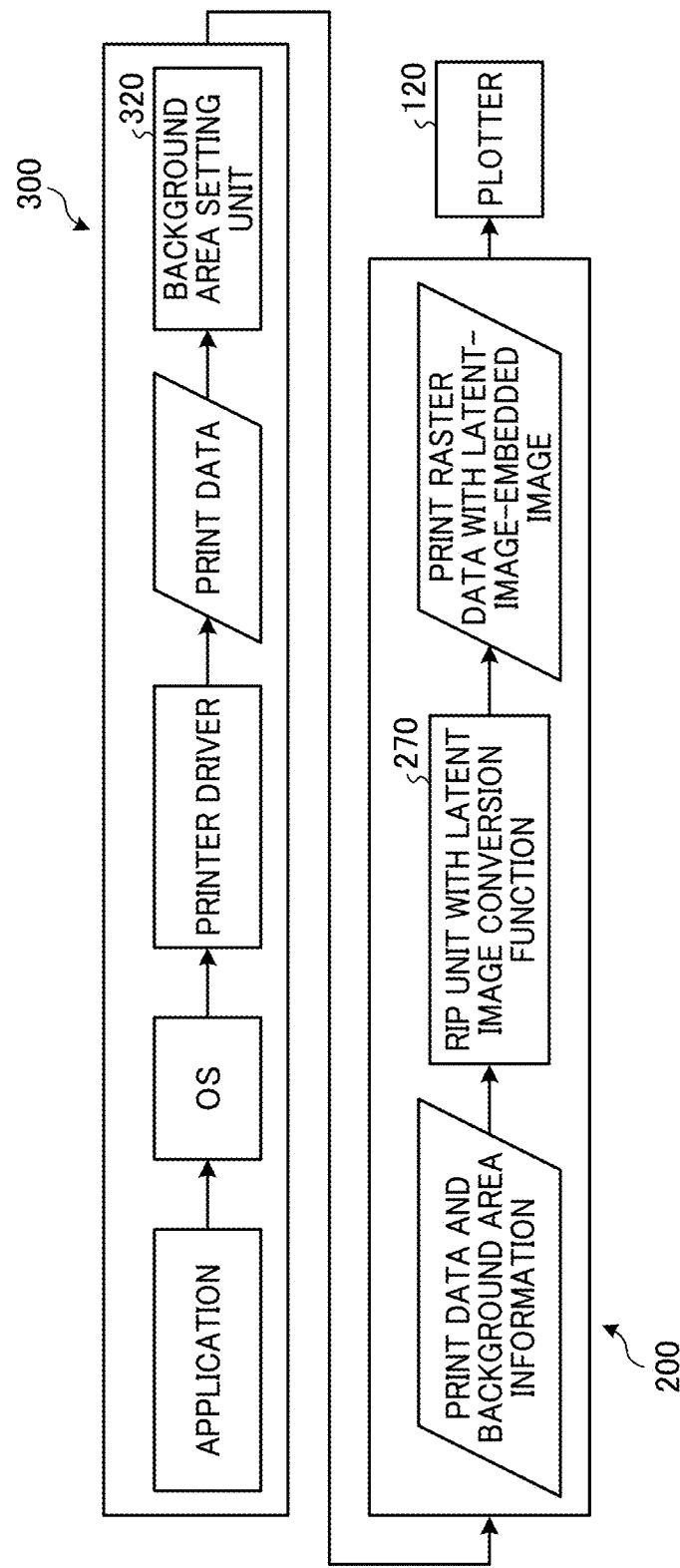
FIG. 24 is a functional block diagram illustrating functions in the printing system according to an eighth embodiment.

FIG. 24 is a functional block diagram illustrating functions in the printing system according to the eighth embodiment. As illustrated in FIG. 24, in the printing system (the image processing apparatus 200 and the client PC 300) according to the eighth embodiment, background area information specified by a background area setting unit 320 is passed together with print data described in PDL to the RIP unit 270 with the latent image conversion function.

The RIP unit 270 with the latent image conversion function receives the print data described in PDL and the background area information. As described above, in general, the PDL data is mainly composed of objects to be rendered such as image objects converted into raster data, graphics objects such as lines and figures, and character objects described in Font data, and coordinate data indicating the printing positions of the objects.

The RIP unit 270 with the latent image conversion function creates raster images of objects to be rendered in the PDL by interpreting the coordinate positions and the rendering command, and renders the raster images in the frame memory.

Figure 25:
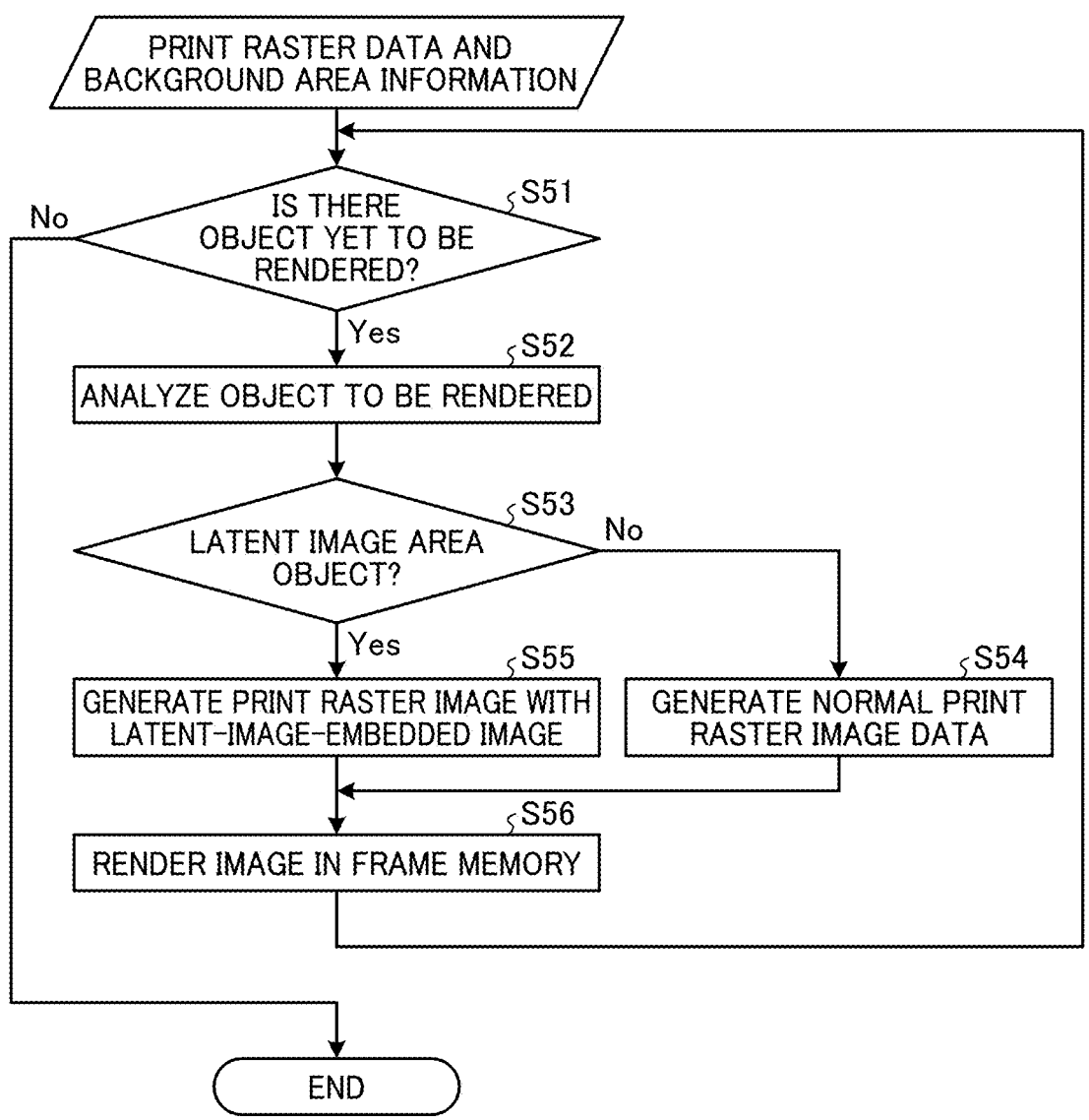
FIG. 25 is a flowchart illustrating a flow of a latent image conversion process performed by a raster image processing (RIP) unit having a latent image conversion function.

FIG. 25 is a flowchart illustrating a flow of a latent image conversion process performed by the RIP unit 270 with the latent image conversion function. As illustrated in FIG. 25, when there is an unsearched object to be rendered (Yes in step S51), the RIP unit 270 with the latent image conversion function analyzes the coordinate position data of the object to be rendered (step S52), and determines whether the object is included in the specified background area information (step S53).

When there is no unsearched object to be rendered, that is, when rendering of all the objects is completed (No in step S51), the RIP unit 270 with the latent image conversion function terminates the process.

When not determining that the object is included in the specified background area information (No in step S53), the RIP unit 270 with the latent image conversion function generates raster data for normal printing (step S54) and renders the raster data in the frame memory (step S56).

On the other hand, when determining that the object is included in the specified background area information (Yes in step S53), the RIP unit 270 with the latent image conversion function composites the object in the background area with an arbitrary latent image acquired by the latent image information acquisition unit 265 and performs latent image conversion to generate print raster data with a latent image-embedded image (step S55), and renders the print raster data with the latent image-embedded image in the frame memory (step S56).

As described above, according to the present embodiment, it is possible to convert document data generated by an arbitrary application into a document with security in which arbitrary information in the original document is set as a background and print the document, without modification of the application.

Ninth Embodiment

Next, a ninth embodiment is described.

In the ninth embodiment, the latent image information and the background information are both extracted from the information generated by a document creation application, which is different from the first to fourth embodiments in which latent image information is acquired from print data and is composited with arbitrary background information to generate a latent-image-embedded image in the print data. Hereinafter, in relation to the ninth embodiment, description of the components identical to those in the first to fourth embodiments will be omitted, and the components different from those in the first to fourth embodiments will be described.

Figure 26:
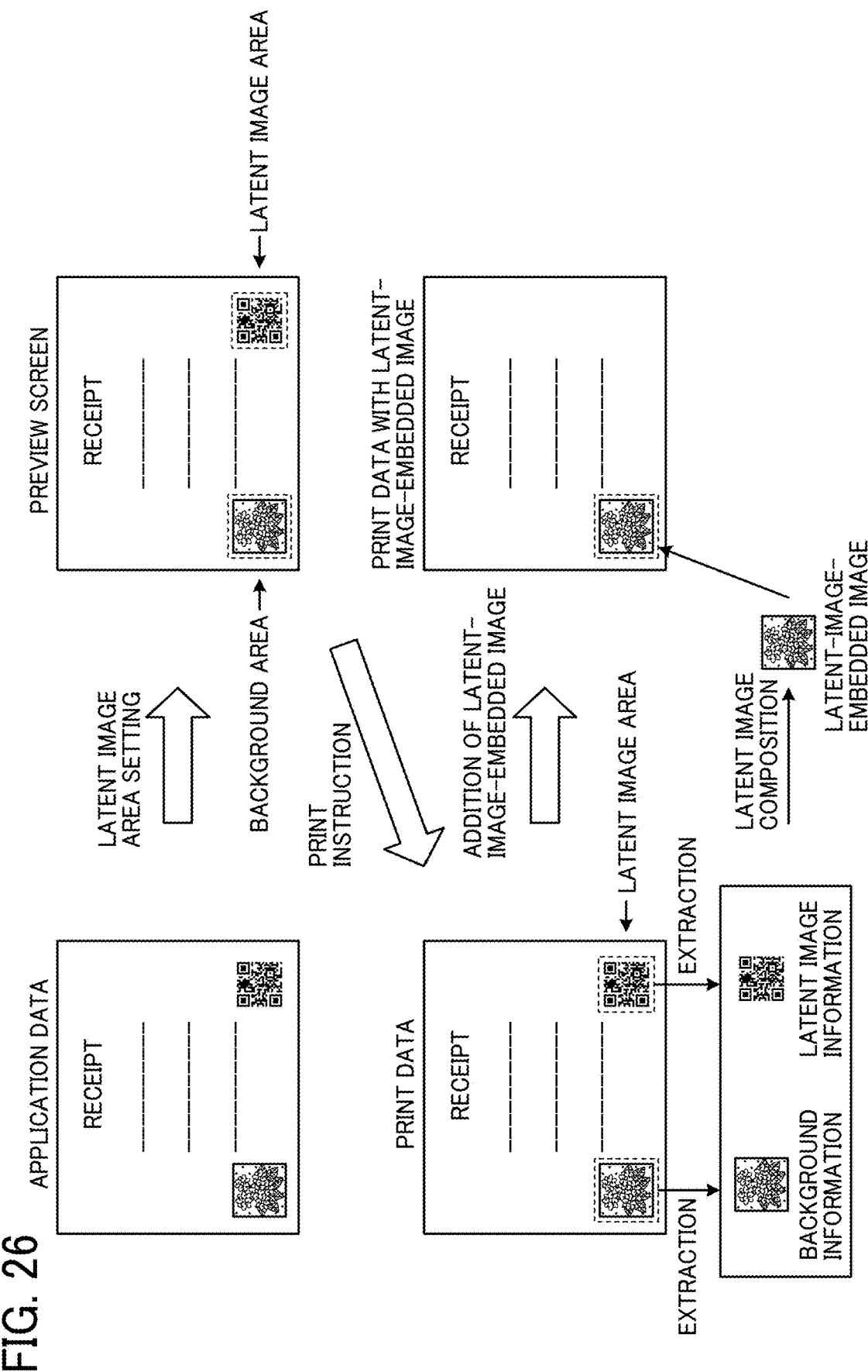
FIG. 26 is a diagram illustrating an outline of a process according to a ninth embodiment.

FIG. 26 is a diagram illustrating an outline of a process according to the ninth embodiment. FIG. 26 illustrates a case where both the background information and the latent image information are both generated by an application. The corresponding background image was generated by an application for making receipts. When a printer driver for latent image printing is specified from a background image application and a print instruction is issued, a print preview screen is started. On the print preview screen, the user can select both latent image information to be concealed as a latent image and image information to be used as background information for embedding the latent image. When the selection of the latent image information and the background information is completed and a print instruction is issued, both the background information and the latent image information are extracted from the print data converted by the printer driver. The extracted latent image information is composited with the similarly extracted background information, converted into a latent-image-embedded image in which the latent image is masked by the background information, and printed. In this manner, the user can extract arbitrary image information to be concealed as a latent image from a document created by an existing application, and conceal the latent image using an arbitrary background in the document.

An example of using the present embodiment is useful, as in the first embodiment, in a case where the information to be concealed as a latent image is image information generated by a document creation application such as a QR code describing the money amount information of a receipt and where the layout of the document is not to be changed.

As described above, by using the information generated by the application as both the latent image information and the background information, the user can conceal arbitrary image information from a document created in advance without disruption in the layout of the document because the background used for concealing is also existing in advance in the document. In addition, as in the first embodiment, the above-described information is extracted from the print data converted from a document application by a printer driver or the like and is converted into a latent image. Thus, the ninth embodiment can be implemented without any modification to the document application the user uses.

Figure 27:
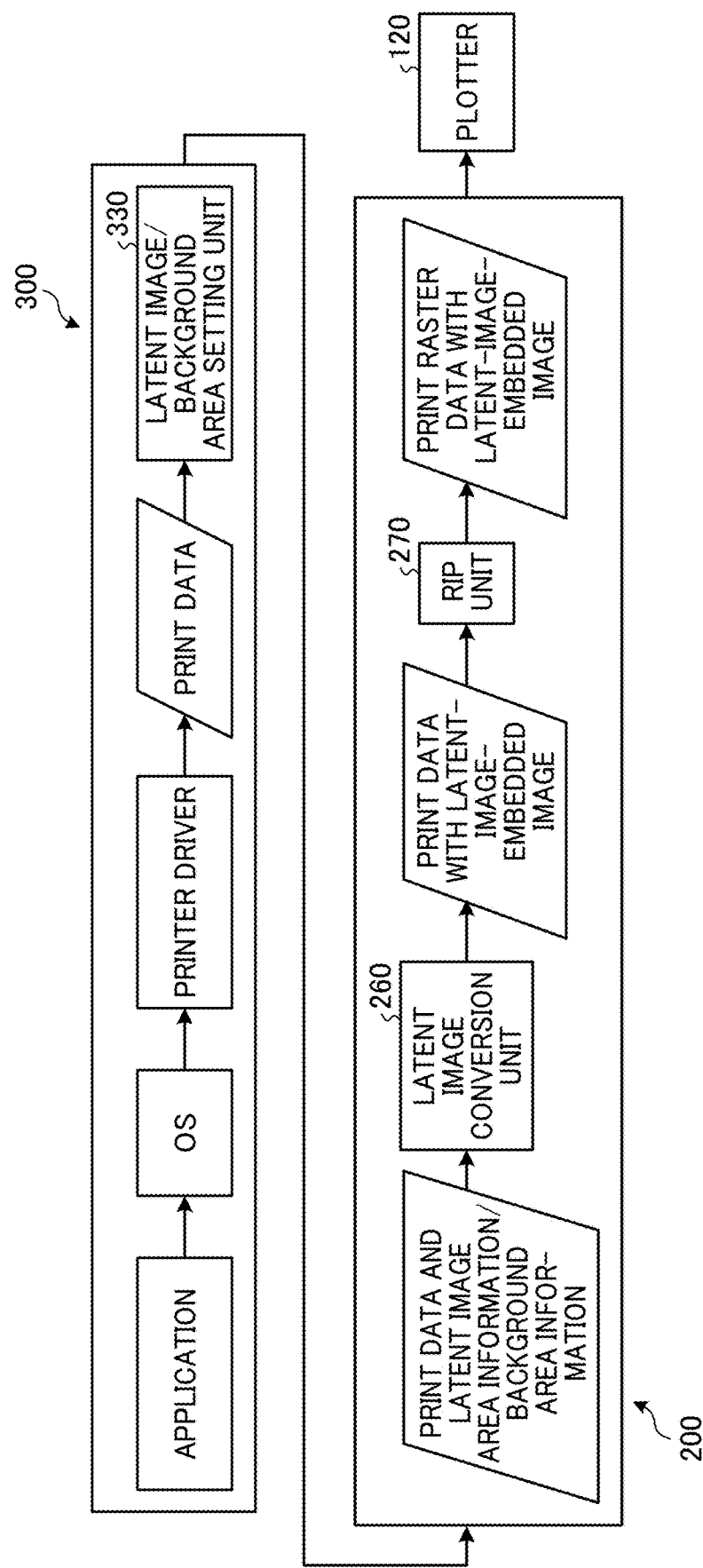
FIG. 27 is a functional block diagram illustrating functions in the printing system according to the ninth embodiment.

FIG. 27 is a functional block diagram illustrating functions in the printing system according to the ninth embodiment. As illustrated in FIG. 27, the client PC 300 includes a latent-image and background area setting unit 330 instead of the latent image area setting unit 310 illustrated in FIG. 5.

As illustrated in FIG. 27, when a print instruction is issued in an application, the application generates print data via the rendering API of the operation system and the printer driver graphics function. The print data is generally in a command data format called page description language (PDL) that can be interpreted by the image forming apparatus 100.

The latent-image and background area setting unit 330 interprets the print data generated by the printer driver and renders a print image on the screen of a client PC 300 as a print preview screen. The user can select the area to be used as the background area information for concealing latent image area information and a latent image on the print preview screen.

FIG. 28 is a diagram illustrating an example of holding selected background area information. As illustrated in FIG. 28, the latent image area and the background area selected on the preview screen are held as background area information (area specification information in coordinates) in the print image. The area information is divided into latent image area information and background area information and can be set at a plurality of places in each page. This means that a plurality of sets of latent image area information and background area information can be set in the document information in such a manner that the latent image information specified in latent image area information 1 is composited with the background information specified in background area information 1 and converted into a latent image, and the latent image information specified in latent image area information 2 is composited with the background information specified in background area information 2 and converted into a latent image.

In the present embodiment, the latent image area information and the background area information selected on the preview screen are held. In some embodiments, for example, the latent image area information and the background area information in the print data may be specified and held by color-related information indicating that an object described in a specific color is to be used as latent image area information or background area information or by the object number in the PDL. Information specified as the latent image area information and the background area information may be changed.

The area information (latent image area information and background area information) specified by the latent-image and background area setting unit 330 is transmitted to the image processing apparatus 200 together with the print data and is passed to the latent image conversion unit 260.

Next, the latent image conversion unit 260 is described.

Figure 29:
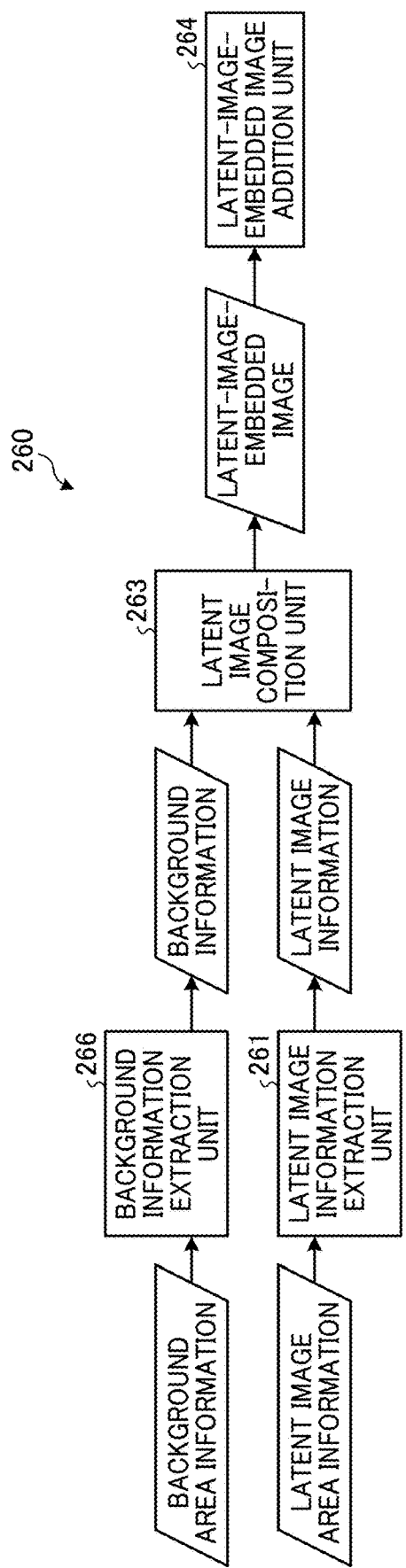
FIG. 29 is a diagram illustrating an outline of a process performed by a latent image conversion unit.

FIG. 29 is a diagram illustrating an outline of a process performed by the latent image conversion unit 260. As illustrated in FIG. 29, the latent image conversion unit 260 includes a latent image information extraction unit 261, a background information extraction unit 266, a latent image composition unit 263, and a latent-image-embedded image addition unit 264.

The latent image information extraction unit 261 extracts an object at a position specified by the latent image area information from the print data as latent image information.

The background information extraction unit 266 extracts an object at a position specified by the background area information from the print data as background information.

The latent image composition unit 263 turns the object of the background information extracted by the background information extraction unit 266 into an image by vector data, and composites the background image with the latent image information extracted by the latent image information extraction unit 261 to create a latent-image-embedded image. The latent image composition process refers to a method for compositing an infrared latent image that is invisible under normal light and can be detected only by an infrared device, using a combination of color materials different in optical characteristics.

The latent-image-embedded image addition unit 264 adds the latent-image-embedded image to the print data by arranging the latent-image-embedded image at the coordinate position where the background image in the print data was present. It is desirable that the latent image-embedded image data be added to the print data in a format that can hold a combination of color materials different in optical characteristics. For example, when an infrared latent image is to be embedded with a combination of color materials of cyan, magenta, and yellow coloring materials exhibiting high infrared transmission and a color material of carbon black exhibiting high infrared absorption, the latent-image-embedded image needs to be held in the print data in CMYK color space format. This is because, when converted into the RGB color space, information about the combination amount of the color materials is lost, so that the latent image may be destroyed. A PDL corresponding to a CMYK color space such as PostScript (registered trademark) needs to be used for print data.

Figure 30:
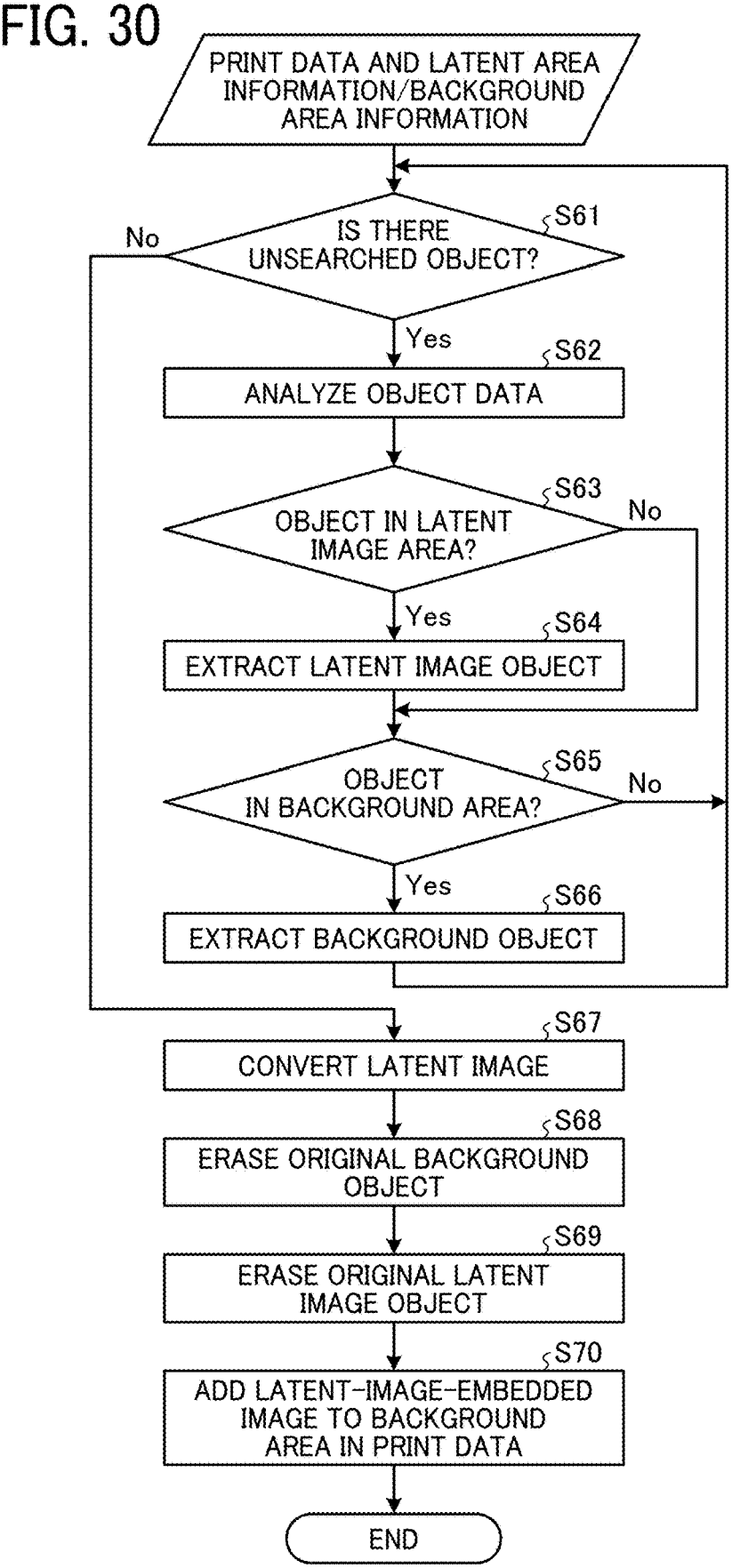
FIG. 30 is a flowchart illustrating a flow of a latent image conversion process performed by a latent image conversion unit.

FIG. 30 is a flowchart illustrating a flow of a latent image conversion process performed by the latent image conversion unit 260. In the process described below, when the print data is described in PDL data, an object in the latent image area information or the background area information is extracted and converted into a latent image-embedded image, and the latent-image-embedded image is added to the PDL data.

In general, the PDL data is mainly composed of objects to be rendered such as image objects converted into raster data, graphics objects such as lines and figures, and character objects described in Font data, and coordinate data indicating the printing positions of the objects.

As illustrated in FIG. 30, when there is an unsearched object to be rendered (Yes in step S61), the latent image information extraction unit 261 analyzes the coordinate position data of the object to be rendered (step S62), and determines whether the object is included in the specified latent image area information (step S63).

When determining that the object is included in the specified latent image area information (Yes in step S63), the latent image information extraction unit 261 extracts the object to be rendered from the latent image area information as the latent image information (step S64). The extracted latent image object is stored in the recording device.

When not determining that the object is included in the specified latent image area information (No in step S63), the background information extraction unit 266 determines whether the object is included in the specified background area information (step S65).

When determining that the object is included in the specified background area information (Yes in step S65), the background information extraction unit 266 extracts the object to be rendered from the background area information as the background information (step S66), and returns to step S61. The extracted background object is recorded in the recording device together with the coordinate position on paper.

When not determining that the object is included in the specified background area information (No in step S65), the background information extraction unit 266 returns to step S61.

When there is no object to be rendered that has been unsearched, that is, when the rendering of all the objects is completed (No in step S61), the latent image composition unit 263 turns the extracted background object and latent image object into images, and composites the latent image and the background image to generate a latent-image-embedded image (step S67).

The latent-image-embedded image addition unit 264 deletes the original background object and the original latent image object from the PDL data (steps S68 and S69).

Referring now to FIGS. 15 and 16, a description is given of the color conversion performed by the color converting unit 33 illustrated in FIG. 2 in the image forming apparatus 100.

The latent-image-embedded image addition unit 264 arranges the generated latent-image-embedded image at the coordinate position where the extracted background object was present in the PDL data (step S70). The latent-image-embedded image needs to be held in the form of a CMYK color space. As the PDL data, PDL data corresponding to a CMYK color space needs to be used in addition to a color space such as RGB or Gray. In the case of using color materials other than cyan, magenta, yellow, and black on the image forming apparatus 100, the latent image needs to be held in the image format in which the respective print amounts of the color materials can be accurately expressed.

The latent image conversion unit 260 generates the print data with the latent-image-embedded image in which the latent image information is embedded in the arbitrary background image in the manner as described above.

Next, the raster image processing (RIP) unit 270 is described. The RIP unit 270 creates print raster data with the latent-image-embedded image of the entire surface of the printing sheet as the print data with the latent-image-embedded image described in the PDL to which the latent-image-embedded image is added. More particularly, the RIP unit 270 converts all the objects in the print data with the latent-image-embedded image into raster images, and renders the raster images in a frame memory that can hold image data of the entire print page.

The objects described in RGB are converted into raster images after the color conversion from RGB to CMYK. The latent-image-embedded image is rendered at a predetermined position in the frame memory without color conversion of the CMYK data.

The plotter 120 outputs the printed matter in which the latent image is embedded by outputting the raster data rendered in the frame memory on the printing paper.

In this manner, according to the present embodiment, extracting background information and latent image information from print data generated by a printer driver, converting the latent image information into a latent-image-embedded image, and adding the latent-image-embedded image to the print data make it possible to convert document data generated by an arbitrary application into a document with security in which arbitrary information in the original document is set as a latent image and a background and print the document, without modification of the application.

Tenth Embodiment

Next, a tenth embodiment is described.

In the tenth embodiment, a latent-image and background area setting unit 330 is implemented to set area information (latent image area information and background area information) separately from the printing operation, which is different from the ninth embodiment in which the latent-image and background area setting unit 330 is implemented to set area information (latent image area information and background area information) after the issue of a print instruction. Hereinafter, in relation to the tenth embodiment, description of the components identical to those in the ninth embodiment will be omitted, and the components different from those in the ninth embodiment will be described.

Figure 31:
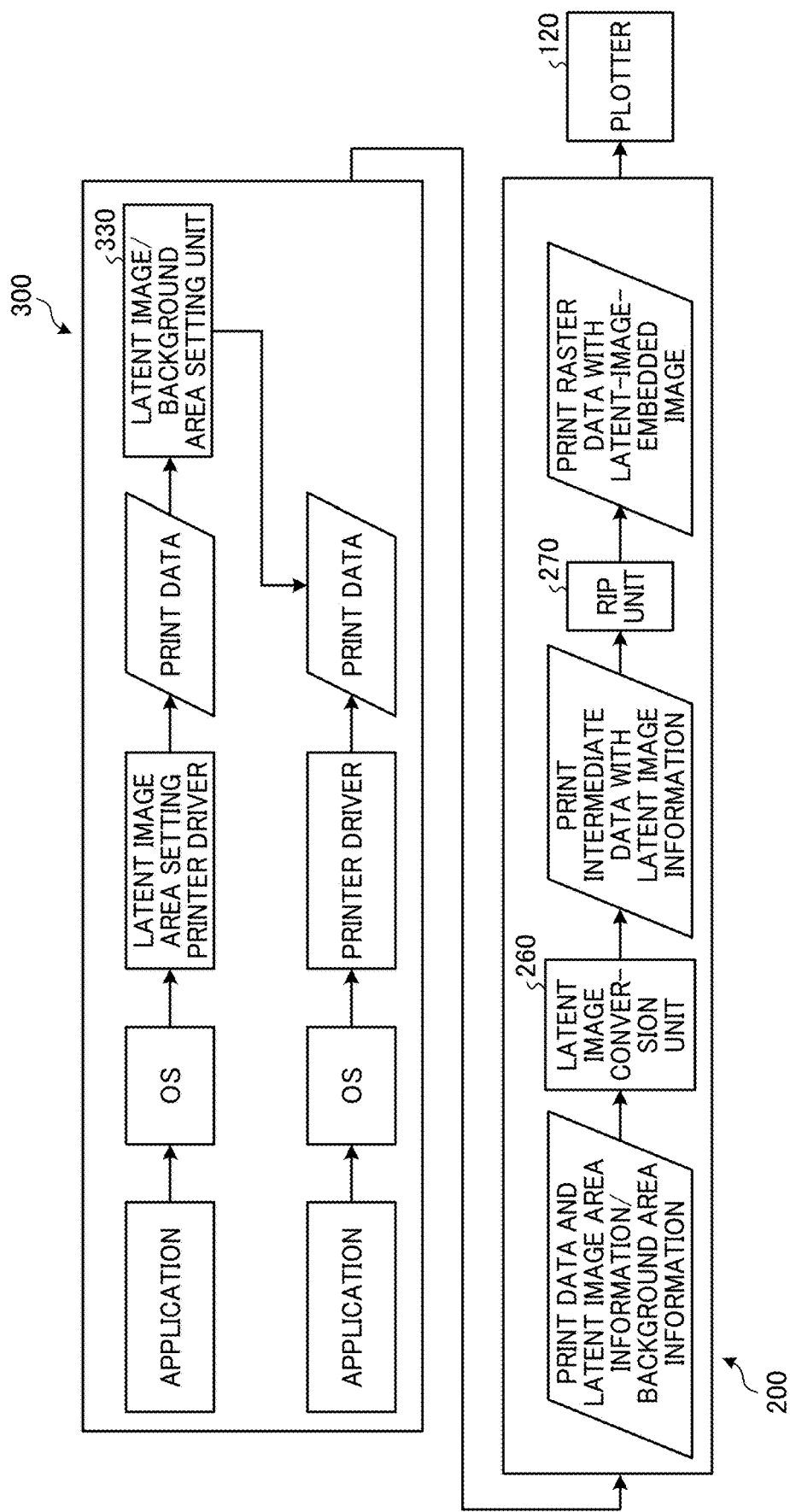
FIG. 31 is a functional block diagram illustrating functions in the printing system according to a tenth embodiment.

FIG. 31 is a functional block diagram illustrating functions in the printing system according to the tenth embodiment. As illustrated in FIG. 31, in the client PC 300 according to the tenth embodiment, a printer driver used for printing and a printer driver for specifying latent image and background are separately configured. In this case, in order to specify latent image area information and background area information, the user specifies a printer driver for specifying a latent image and a background and issues a print instruction from the application. When a printing instruction is issued by specifying a printer driver for a latent image and a background, the rendering API of the operation system is called from the application, and print data is generated via the graphics function of the printer driver.

The latent-image and background area setting unit 330 interprets the print data and renders a print image on the client PC 300 as a print preview screen. The user selects an area as latent image area information and background area information on the preview screen. The areas as the latent image area information and the background area information are held in the client PC 300 as area information (latent image area information and background area information) in the print data. When the storage of the area information (the latent image area information and the background area information) is completed, the printing operation by the driver for specifying the background is completed, and the printing is not actually executed.

To print the print raster data with the latent image-embedded image, the user specifies a printer driver corresponding to the latent image embedding function from the application and issues a print instruction. When a print instruction is issued, print data is similarly generated, transmitted to the image processing apparatus 200 together with the latest area information (latent image area information and background area information) on the client PC 300, and passed to the latent image conversion unit 260.

As described above, according to the present embodiment, the latent image area information and the background area information do not necessarily need to be specified during the print flow. The latent image area information and the background area information may be separately provided in the latent-image and background area setting unit 330 or predetermined area information (latent image area information and background area information) may be constantly held by fixed parameters. Even predetermined fixed area information (latent image area information and background area information) is sufficiently effective when the format of the document generated by the application is the same and only the contents are different.

Eleventh Embodiment

Next, an eleventh embodiment will be described.

The eleventh embodiment differs from the ninth and tenth embodiments in that a latent image and a background are extracted from data obtained by converting PDL data into raster data for a plotter 120. Hereinafter, in relation to the eleventh embodiment, description of the components identical to those in the ninth and tenth embodiments will be omitted, and the components different from those in the ninth and tenth embodiments will be described.

Figure 32:
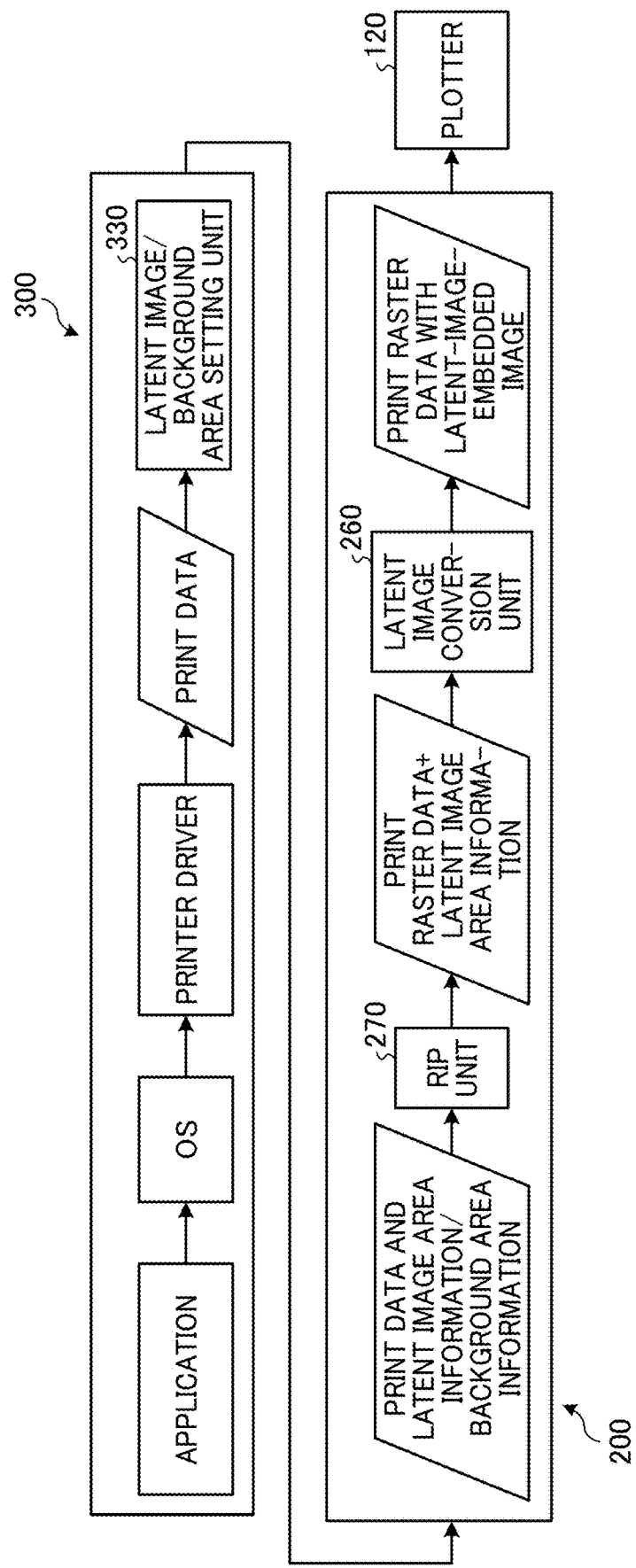
FIG. 32 is a functional block diagram illustrating functions in the printing system according to an eleventh embodiment.

FIG. 32 is a functional block diagram illustrating functions in the printing system according to the eleventh embodiment. As illustrated in FIG. 32, in the image processing apparatus 200 according to the eleventh embodiment, latent image area information and background area information specified by a latent-image and background area setting unit 330 is passed to a RIP unit 270 together with PDL data.

For the PDL data, the RIP unit 270 creates raster data of the entire printing paper, and transfers the raster data to a latent image conversion unit 260 together with the latent image area information and background area information specified by the latent-image and background area setting unit 330. The raster data here is assumed to be expressed in the CMYK color space.

The latent image conversion unit 260 extracts a latent image and a background from the data obtained by converting the PDL data into the raster data for the plotter 120, and generates print raster data with a latent-image-embedded image.

Figure 33:
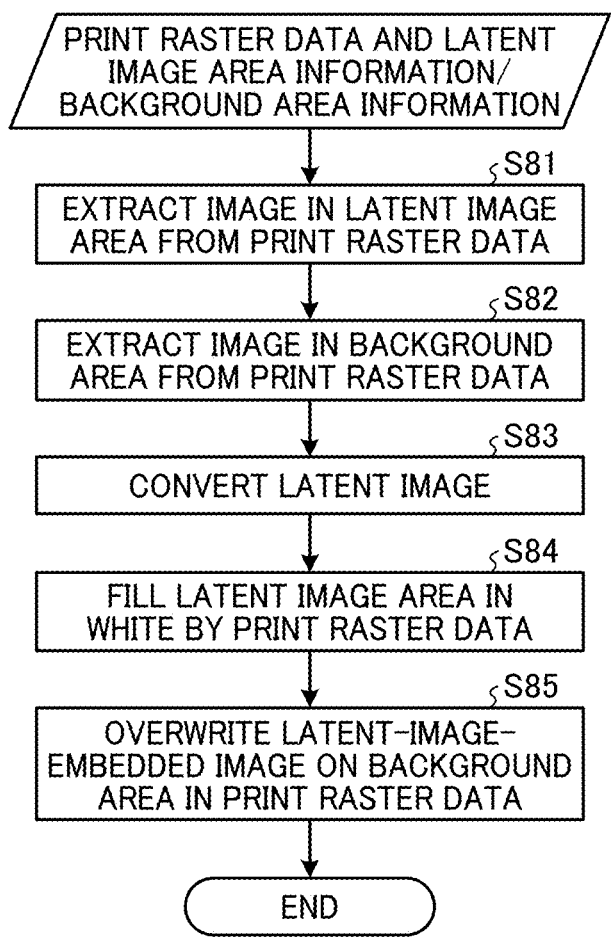
FIG. 33 is a flowchart illustrating a flow of a latent image conversion process performed by a latent image conversion unit.

FIG. 33 is a flowchart illustrating a flow of a latent image conversion process performed by the latent image conversion unit 260. As illustrated in FIG. 33, the latent image conversion unit 260 extracts an image of an area corresponding to the latent image area from the converted print raster data (step S81).

Next, the latent image conversion unit 260 extracts an image of an area corresponding to the background area from the converted print raster data (step S82).

Next, the latent image conversion unit 260 composites the extracted latent image information and background information to generate a latent-image-embedded image (step S83).

Next, the latent image conversion unit 260 erases the latent image information by filling with white the image area of the original latent image area (step S84).

Next, the latent image conversion unit 260 generates print raster data with the latent image-embedded image by overwriting the area extracted as the background image information from the raster data with the latent image-embedded image (step S85).

The plotter 120 prints the print raster data with the latent image-embedded image and outputs the printed matter in which the latent image is embedded.

As described above, according to the present embodiment, the latent image information and the background information do not necessarily need to be specified during the print flow. The latent image information and the background information may be separately provided in the latent-image and background area setting unit 330 or predetermined area information may be always held by a fixed parameter. In such a case, the user does not need to call the latent-image and background area setting unit 330 and set the latent image area and the background area every time printing is performed, and thus can reduce the time and effort of setting. Even predetermined fixed area information will be sufficiently effective when the format of the document generated by the application is the same and only the contents are different.

Regarding the fixed area information, the predetermined area information may be stored not only in the client PC 300 but also in the image processing apparatus 200. In such a case, even if the client PC 300 does not have the latent-image and background area setting unit 330, the conversion to the latent-image-embedded image can be performed by only the function of the image processing apparatus 200.

Twelfth Embodiment

Next, a twelfth embodiment is described.

The twelfth embodiment is different from the ninth to eleventh embodiments in providing a latent image conversion function is to a RIP unit 270 that interprets PDL data and generates raster data, so that information specified as a latent image and a background in print data is converted into a latent-image-embedded image. Hereinafter, in relation to the twelfth embodiment, description of the components identical to those in the ninth to eleventh embodiments will be omitted, and the components different from those in the ninth to eleventh embodiments will be described.

Figure 34:
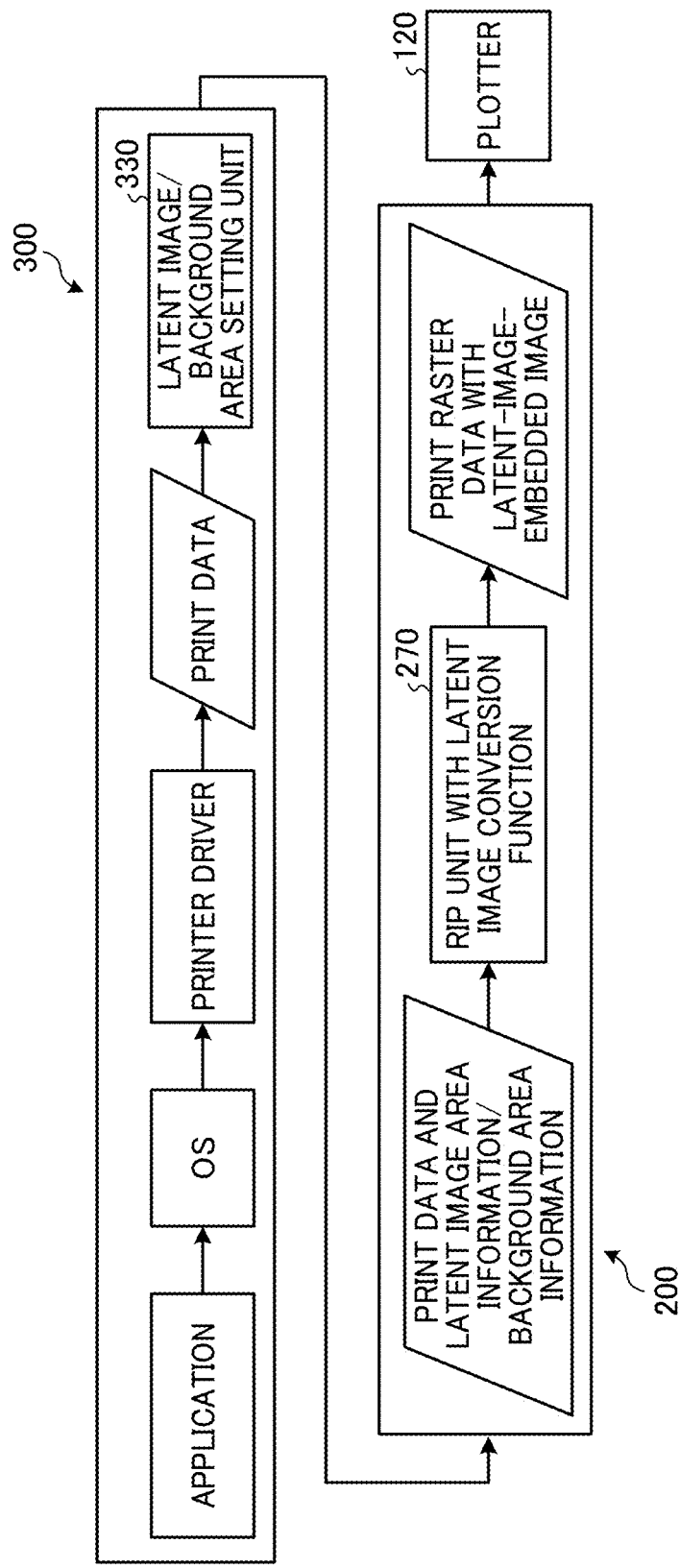
FIG. 34 is a functional block diagram illustrating functions in the printing system according to a twelfth embodiment.

FIG. 34 is a functional block diagram illustrating functions in the printing system according to the twelfth embodiment. As illustrated in FIG. 34, in the printing system (the image processing apparatus 200 and the client PC 300) according to the twelfth embodiment, latent image area information and background area information specified by a latent-image and background area setting unit 330 is passed together with print data described in PDL to the RIP unit 270 with the latent image conversion function.

The RIP unit 270 with the latent image conversion function receives the print data described in PDL, the latent image area information, and the background area information. As described above, in general, the PDL data is mainly composed of objects to be rendered such as image objects converted into raster data, graphics objects such as lines and figures, and character objects described in Font data, and coordinate data indicating the printing positions of the objects.

The RIP unit 270 with the latent image conversion function creates raster images of objects to be rendered in the PDL by interpreting the coordinate positions and the rendering command, and renders the raster images in the frame memory.

Figure 35:
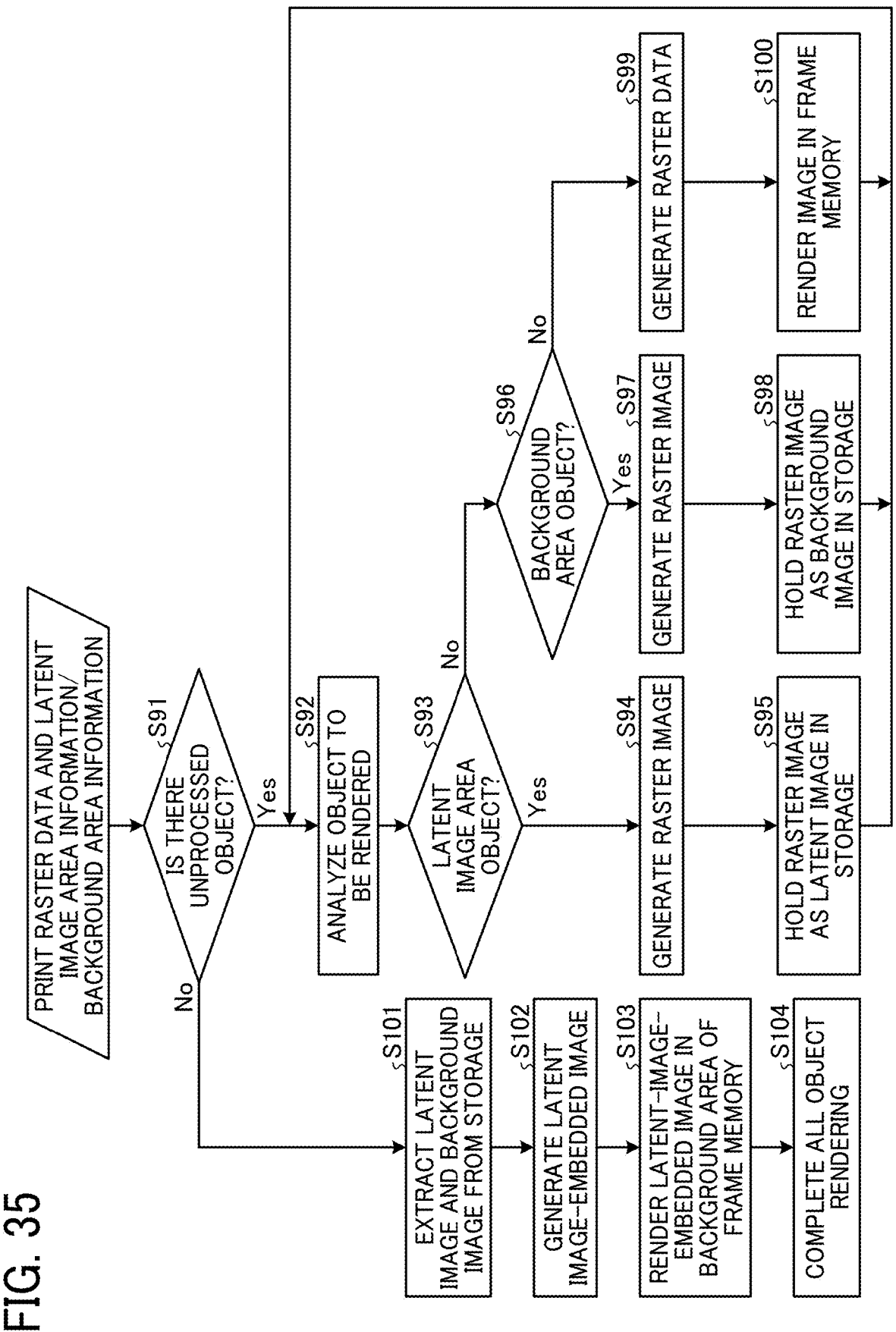
FIG. 35 is a flowchart illustrating a flow of a latent image conversion process performed by a raster image processing (RIP) unit having a latent image conversion function.

FIG. 35 is a flowchart illustrating a flow of a latent image conversion process performed by the RIP unit 270 with the latent image conversion function. As illustrated in FIG. 35, when there is an unsearched object to be rendered (Yes in step S91), the RIP unit 270 with the latent image conversion function analyzes the coordinate position data of the object to be rendered (step S92), and determines whether the object is included in the specified latent image area information (step S93).

When determining that the object is included in the specified latent image area information (Yes in step S93), the RIP unit 270 with the latent image conversion function does not render the object in the latent image area in the frame memory but converts the object into a raster image (step S94), and saves the converted raster image as a latent image in a recording device such as a storage (step S95).

On the other hand, when not determining that the object is included in the specified latent image area information (No in step S93), the RIP unit 270 with the latent image conversion function determines whether the object is included in the specified background area information (step S96).

When determining that the object is included in the specified background area information (Yes in step S96), the RIP unit 270 with the latent image conversion function does not render the object in the background area in the frame memory but converts the object into a raster image (step S97), and saves the converted raster image as a background image in a recording device such as a storage (step S98). As for the background, it is preferable to simultaneously hold the position information of the background object on paper.

On the other hand, when not determining that the object is included in the specified background area information (No in step S96), the RIP unit 270 with the latent image conversion function generates raster data for normal printing (step S99), renders the raster data in the frame memory (step S100), and returns to step S92.

That is, for objects that do not correspond to the latent image area or the background area, the RIP unit 270 with the latent image conversion function generates respective raster images of the objects and renders the same in the frame memory, thereby completing all the rendering. The RIP unit 270 with the latent image conversion function generates raster images of objects corresponding to the latent image area or the background area, but does not render the raster image in the frame memory but holds raster data of the objects alone separately stored in a recording device such as a storage.

When there is no unsearched object to be rendered, that is, when rendering of all the objects is completed (No in step S91), the RIP unit 270 with the latent image conversion function extracts a latent image and a background image from the recording device such as a storage (step S101), and composites the latent image and the background image to generate a latent-image-embedded image (step S102).

After that, the RIP unit 270 with the latent image conversion function renders the latent image-embedded image at the rendering position of the original background object in the frame memory (step S103), thereby completing the rendering of the raster data with the latent image-embedded image, to which the latent image-embedded image is added, in the frame memory (step S104).

As described above, according to the present embodiment, it is possible to convert document data generated by an arbitrary application into a document with security in which arbitrary information in the original document is set as a latent image and a background and print the document, without modification of the application.

In the foregoing embodiments, the image processing apparatus of the present invention is applied to a multifunction peripheral having at least two of a copy function, a printer function, a scanner function, and a facsimile function as an example. However, the present invention can be applied to any image forming apparatus such as a copier, a printer, a scanner, and a facsimile machine.

An information processing device such as the print server 400 or the client PC 300 may be applied as the image processing device according to an embodiment of the present disclosure. In such a case, the information processing device may include a CPU that operates according to an installed program, thereby performing substantially the same function as the function of the image processing apparatus 200 to generate a latent-image-embedded image.

The processing units illustrated in FIGS. 5, 11, 12, 14, 15, 21, 22, 24, 27, 31, 32, and 34 are distributed between the information processing apparatus such as the client PC 300 or the print server 400 and the image processing apparatus. In some embodiments, all the processing units may be implemented by one information processing apparatus or image processing apparatus.

According to the present embodiment, a configuration in which an image expressed by a two-dimensional code (QR code (registered trademark)) is embedded as a latent image in a background image has been described. In some embodiments, for example, the image embedded as a latent image may be any image such as a photographic image, a graphics image, a character image, or a code image other than a QR code (registered trademark).

The above-described embodiments are illustrative and do not limit the present disclosure. In addition, the embodiments and modifications or variations thereof are included in the scope and the gist of the invention, and are included in the invention described in the claims and the equivalent scopes thereof. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An image processing apparatus, comprising:
processing circuitry configured to:
   extract an image from print data, the image being a first background image or a first latent image within an area in the print data;
   generate a latent-image-embedded image by one of:
      in a case that the first background image is extracted without the first latent image, compositing the first background image with a second latent image;
      in a case that the first latent image is exacted without the first background image, compositing the first latent image with a second background image; and
      in a case that both the first latent image and the first background image are extracted, compositing the first latent image with the first background image;
   delete the image from the print data;
   add the latent-image-embedded image to the area in the print data to generate modified print data; and
   output the modified print data for printing.

2. The image processing apparatus according to claim 1, wherein the processing circuitry is configured to extract the image from the print data in accordance with area information indicating the area in the print data.

3. A printing system, comprising:
the image processing apparatus according to claim 2; and
an information processing apparatus including second processing circuitry configured to interpret the print data and output, via a print preview screen for selection by a user, a second area to be concealed as the image, wherein
the processing circuitry of the image processing apparatus is configured to extract the image in accordance with area information indicating the second area selected with the second processing circuitry of the information processing apparatus.

4. The image processing apparatus according to claim 1, wherein the processing circuitry is configured to extract the image using color information from the print data in accordance with area information indicating the area in the print data.

5. The image processing apparatus according to claim 1, wherein the print data is data described in a page description language.

6. The image processing apparatus according to claim 1, wherein the print data is raster image data.

7. The image processing apparatus according to claim 1, wherein the print data is portable document format data.

8. A printing system, comprising:
the image processing apparatus according to claim 1; and
an information processing apparatus including second processing circuitry configured to interpret the print data and output, via a print preview screen for selection by a user, a second area to be used as the first background image for concealing a latent image,
wherein the processing circuitry of the image processing apparatus is configured to extract the first background image in accordance with area information indicating the second area selected with the second processing circuitry of the information processing apparatus.

9. A method for embedding a latent image in an electronic device, the method comprising:
extracting an image from print data, the image being a first latent image or a first background image within an area in the print data;
generating a latent-image-embedded image by one of:
in a case that the first background image is extracted without the first latent image, compositing the first background image with a second latent image;
in a case that the first latent image is exacted without the first background image, compositing the first latent image with a second background image; and
in a case that both the first latent image and the first background image are extracted, compositing the first latent image with the first background image;
deleting the image from the print data;
adding the latent-image-embedded image to the area in the print data to generate modified print data; and
outputting the modified print data for printing.

10. The method according to claim 9, wherein the extracting includes extracting the image from the print data in accordance with area information indicating the area in the print data.

11. The method according to claim 9, wherein the extracting includes extracting the image using color information from the print data in accordance with area information indicating the area in the print data.

12. A non-transitory storage medium storing computer executable instructions which, when executed by a computer, cause the computer to:
extract an image from print data, the image being a first latent image or a first background image within an area in the print data;
generate a latent-image-embedded image by one of:
in a case that the first background image is extracted without the first latent image, compositing the first background image with a second latent image;
in a case that the first latent image is exacted without the first background image, compositing the first latent image with a second background image; and
in a case that both the first latent image and the first background image are extracted, compositing the first latent image with the first background image;
delete the image from the print data;
add the latent-image-embedded image to the area in the print data to generate modified print data; and
output the modified print data for printing.

* * * * *